(12) United States Patent
Mueller et al.

(10) Patent No.: US 7,106,788 B1
(45) Date of Patent: Sep. 12, 2006

(54) METHOD AND SYSTEM FOR ANALYTICALLY COMPUTING AND USING AN ANSPCM SIGNAL

(75) Inventors: A. Joseph Mueller, San Diego, CA (US); R. John Rosenlof, LaMesa, CA (US)

(73) Assignee: 3Com Corporation, Marlborough, MA (US)

( * ) Notice: Subject to any disclaimer, the term of this patent is extended or adjusted under 35 U.S.C. 154(b) by 1401 days.

(21) Appl. No.: 09/703,338

(22) Filed: Oct. 31, 2000

Related U.S. Application Data

(60) Provisional application No. 60/166,637, filed on Nov. 19, 1999.

(51) Int. Cl.
*H04B 1/38* (2006.01)

(52) U.S. Cl. ...................................................... 375/222
(58) Field of Classification Search ................ 375/222, 375/233; 709/242, 227; 379/93.01, 93.05, 379/93.08, 27
See application file for complete search history.

(56) References Cited

U.S. PATENT DOCUMENTS

| | | | |
|---|---|---|---|
| 4,394,767 A | | 7/1983 | Shum |
| 6,704,399 B1 * | | 3/2004 | Olafsson .................. 379/93.31 |

FOREIGN PATENT DOCUMENTS

| | | | |
|---|---|---|---|
| EP | 0615352 A1 | 9/1994 |
| EP | 0954158 A2 | 11/1999 |
| EP | 1 223 723 A2 | 7/2002 |
| WO | WO 98/51031 | 11/1998 |
| WO | WO 01/008373 | 2/2001 |

OTHER PUBLICATIONS

U.S. Appl. No. 09/361,842, filed Jul. 27, 1999 entitled "Method and Apparatus for Fast V.90 Modem Startup".
U.S. Appl. No. 09/394,018, filed Sep. 10, 1999 entitled "Method and Apparatus for Quick Modem Reconnect".
U.S. Appl. No. 09/416,482, filed Oct. 2, 1999 entitled "Signaling Mechanism for Modem Connection Holding and Reconnecting".

* cited by examiner

*Primary Examiner*—Khai Tran
(74) *Attorney, Agent, or Firm*—McDonnell Boehnen Hulbert & Berghoff LLP

(57) ABSTRACT

A method and system for analytically and dynamically generating a repeatable digital probing signal representing an answer tone. The probing signal may conveniently be used by a modem to determine whether characteristics of the communication path between the modem and another end are sufficiently similar to these of a previous communication path, such that a shortened training sequence can be employed between two ends. When the modem initiates communication, the modem applies a predefined algorithm to dynamically generate a sequence of samples representing an answer tone signal. Next, the modem encodes the generated sequence of samples into a sequence of codewords and sends it to a second modem via a transmission path. When the second modem receives each codeword of the sequence, the second modem dynamically generates a respective codeword and compares it to the received codeword. Using the received sequence of codewords and the dynamically generated sequence of codewords, the second modem may determine whether a shortened training sequence may be employed.

58 Claims, 9 Drawing Sheets

FIGURE 5A

|  | μ-LAW | | | | A-LAW | | | |  | μ-LAW | | | | A-LAW | | | |
|---|---|---|---|---|---|---|---|---|---|---|---|---|---|---|---|---|---|
|  | -09 | -12 | -15 | -18 | -09 | -12 | -15 | -18 |  | -09 | -12 | -15 | -18 | -09 | -12 | -15 | -18 |
| 0 | 22 | 29 | 2F | 38 | 08 | 03 | 1A | 13 | 62 | CD | D2 | D9 | DF | E5 | FC | F7 | CC |
| 1 | D8 | DD | E3 | E9 | F6 | C9 | C1 | DB | 63 | A2 | A9 | B0 | B9 | 89 | 80 | 9B | 90 |
| 2 | A2 | A9 | B0 | B9 | 88 | 80 | 9B | 90 | 64 | 3D | 43 | 4B | 51 | 14 | 6F | 67 | 7F |
| 3 | 42 | 49 | 4F | 57 | 6E | 61 | 78 | 71 | 65 | 24 | 2A | 31 | 3A | 0E | 01 | 18 | 11 |
| 4 | 23 | 2A | 31 | 39 | 09 | 00 | 18 | 10 | 66 | B4 | BB | C2 | CA | 9F | 96 | EE | E6 |
| 5 | B8 | BD | C5 | CC | 93 | 95 | ED | E4 | 67 | A6 | AC | B4 | BB | 8C | 86 | 9F | 96 |
| 6 | A5 | AB | B3 | BB | 8F | 86 | 9E | 96 | 68 | 2E | 35 | 3C | 44 | 05 | 1C | 17 | 6C |
| 7 | 30 | 37 | 3E | 46 | 1B | 12 | 15 | 62 | 69 | 28 | 2E | 36 | 3D | 03 | 04 | 1D | 14 |
| 8 | 27 | 2D | 35 | 3D | 02 | 04 | 1C | 14 | 70 | AA | B0 | B9 | BF | 81 | 9B | 90 | EB |
| 9 | AC | B2 | BA | C1 | 86 | 99 | 91 | E9 | 71 | AB | B1 | BA | C0 | 86 | 98 | 91 | E8 |
| 10 | AA | AF | B8 | BF | 81 | 9A | 93 | EA | 72 | 27 | 2D | 35 | 3D | 02 | 04 | 1C | 14 |
| 11 | 29 | 2E | 37 | 3E | 03 | 05 | 12 | 15 | 73 | 2F | 37 | 3E | 46 | 1A | 12 | 15 | 62 |
| 12 | 2E | 34 | 3C | 43 | 04 | 1F | 17 | 6F | 74 | A5 | AB | B3 | BB | 8F | 86 | 9E | 96 |
| 13 | A6 | AC | B4 | BC | 8C | 87 | 9F | 97 | 75 | B7 | BD | C4 | CC | 92 | 94 | ED | E4 |
| 14 | B4 | BA | C1 | C9 | 9F | 91 | E9 | E1 | 76 | 23 | 2A | 31 | 3A | 0E | 01 | 18 | 11 |
| 15 | 24 | 2B | 32 | 3A | 0E | 01 | 19 | 11 | 77 | 40 | 47 | 4E | 55 | 68 | 63 | 7A | 73 |
| 16 | 3C | 42 | 4A | 50 | 17 | 6E | 66 | 7E | 78 | A2 | A9 | B0 | B9 | 88 | 80 | 9B | 90 |
| 17 | A2 | A9 | B0 | B9 | 89 | 80 | 9B | 90 | 79 | D5 | DA | DF | E6 | F3 | F4 | CD | C4 |
| 18 | CB | CF | D7 | DD | E7 | F9 | F6 | C9 | 80 | 22 | 29 | 2F | 38 | 08 | 03 | 1A | 13 |
| 19 | 22 | 29 | 2F | 38 | 08 | 03 | 1A | 13 | 81 | DD | E2 | E8 | ED | C9 | C0 | DA | DF |
| 20 | 7C | 7D | 7D | 7E | 54 | 54 | 55 | 55 | 82 | A2 | A9 | AF | B9 | 88 | 80 | 9A | 90 |
| 21 | A2 | A9 | AF | B8 | 88 | 83 | 9A | 93 | 83 | 44 | 4A | 50 | 58 | 6C | 66 | 7E | 76 |
| 22 | 4B | 50 | 58 | 5E | 67 | 7E | 76 | 4E | 84 | 23 | 2A | 31 | 39 | 09 | 00 | 18 | 10 |
| 23 | 22 | 29 | 30 | 39 | 09 | 00 | 1B | 10 | 85 | B9 | BE | C7 | CD | 90 | 95 | E3 | E5 |
| 24 | BC | C2 | CA | D0 | 97 | EE | E6 | FE | 86 | A4 | AB | B2 | BB | 8F | 86 | 99 | 96 |
| 25 | A4 | AB | B1 | BA | 8E | 81 | 99 | 91 | 87 | 31 | 38 | 3F | 47 | 18 | 13 | 6A | 63 |
| 26 | 34 | 3B | 41 | 4A | 1F | 16 | 69 | 66 | 88 | 27 | 2D | 35 | 3C | 0D | 07 | 1C | 17 |
| 27 | 26 | 2C | 34 | 3C | 0C | 07 | 1F | 17 | 89 | AC | B2 | BB | C1 | 87 | 99 | 96 | E9 |
| 28 | AE | B5 | BC | C4 | 84 | 9C | 97 | EC | 90 | AA | AF | B8 | BF | 80 | 9A | 93 | EA |
| 29 | A8 | AE | B7 | BE | 83 | 85 | 92 | 95 | 91 | 29 | 2E | 37 | 3E | 03 | 05 | 12 | 15 |
| 30 | 2A | 2F | 38 | 3F | 01 | 1A | 13 | 6A | 92 | 2D | 34 | 3C | 43 | 04 | 1F | 17 | 6F |
| 31 | 2C | 32 | 3A | 41 | 06 | 19 | 11 | 69 | 93 | A6 | AC | B4 | BC | 8D | 87 | 9F | 97 |
| 32 | A7 | AD | B5 | BD | 82 | 84 | 9C | 94 | 94 | B3 | BA | C0 | C8 | 9E | 91 | E8 | E1 |
| 33 | AF | B7 | BE | C6 | 9A | 92 | 95 | E2 | 95 | 24 | 2B | 32 | 3A | 0F | 01 | 19 | 11 |
| 34 | 25 | 2B | 33 | 3B | 0F | 06 | 1E | 16 | 96 | 3B | 40 | 49 | 4F | 16 | 68 | 61 | 78 |
| 35 | 38 | 3D | 45 | 4C | 13 | 14 | 6D | 64 | 97 | A2 | AA | B0 | B9 | 89 | 80 | 9B | 90 |
| 36 | A3 | AA | B1 | B9 | 8E | 81 | 98 | 90 | 98 | C8 | CE | D5 | DB | E0 | FA | F3 | CA |
| 37 | C1 | C8 | CE | D6 | E9 | E0 | FB | F0 | 99 | 22 | 29 | 2F | 38 | 08 | 00 | 1A | 13 |
| 38 | 22 | 29 | 30 | 39 | 08 | 00 | 1B | 10 | 100 | 6C | 6F | 73 | 76 | 5E | 5D | 53 | 51 |
| 39 | 57 | 5C | 62 | 68 | 71 | 4B | 40 | 5A | 101 | A2 | A9 | AF | B8 | 88 | 83 | 9A | 93 |
| 40 | A2 | A9 | AF | B8 | 88 | 83 | 9A | 93 | 102 | 4E | 54 | 5B | 60 | 7A | 72 | 75 | 42 |
| 41 | 5B | 5F | 66 | 6B | 75 | 4C | 44 | 59 | 103 | 22 | 29 | 30 | 39 | 09 | 00 | 1B | 10 |
| 42 | 22 | 29 | 30 | 39 | 08 | 00 | 1B | 10 | 104 | BE | C4 | CC | D2 | 95 | EC | E4 | FC |
| 43 | C3 | CA | CF | D7 | EF | E6 | F9 | F1 | 105 | A3 | AA | B1 | BA | 8E | 81 | 98 | 91 |
| 44 | A3 | AA | B1 | B9 | 89 | 80 | 98 | 90 | 106 | 35 | 3B | 42 | 4A | 1C | 16 | 6E | 66 |
| 45 | 38 | 3E | 46 | 4D | 13 | 15 | 62 | 65 | 107 | 25 | 2C | 33 | 3B | 0C | 06 | 1E | 16 |
| 46 | 25 | 2B | 32 | 3B | 0F | 06 | 19 | 16 | 108 | AE | B5 | BD | C4 | 85 | 9C | 94 | EC |
| 47 | B0 | B8 | BE | C7 | 9B | 93 | 95 | E3 | 109 | A8 | AE | B6 | BD | 83 | 84 | 9D | 94 |
| 48 | A7 | AD | B5 | BC | 8D | 87 | 9C | 97 | 110 | 2B | 30 | 39 | 3F | 01 | 1B | 10 | 6B |
| 49 | 2C | 32 | 3A | 41 | 07 | 19 | 11 | 69 | 111 | 2B | 31 | 3A | 40 | 06 | 18 | 11 | 68 |
| 50 | 2A | 2F | 38 | 3F | 00 | 1A | 13 | 6A | 112 | A8 | AD | B6 | BD | 82 | 84 | 9D | 94 |
| 51 | A9 | AE | B7 | BE | 83 | 85 | 92 | 95 | 113 | AF | B6 | BD | C5 | 85 | 9D | 94 | ED |
| 52 | AD | B4 | BC | C3 | 84 | 9F | 97 | EF | 114 | 25 | 2C | 33 | 3B | 0C | 06 | 1E | 16 |
| 53 | 26 | 2C | 34 | 3C | 0D | 07 | 1F | 17 | 115 | 36 | 3C | 44 | 4B | 1D | 17 | 6C | 67 |
| 54 | 33 | 3A | 40 | 49 | 1E | 11 | 68 | 61 | 116 | A3 | AA | B1 | BA | 8E | 81 | 98 | 91 |
| 55 | A4 | AB | B2 | BA | 8E | 81 | 99 | 91 | 117 | BF | C6 | CD | D4 | EB | E2 | E5 | F2 |
| 56 | BC | C1 | C9 | CF | 97 | E9 | E1 | F9 | 118 | 22 | 29 | 30 | 39 | 09 | 00 | 1B | 10 |
| 57 | 22 | 2A | 30 | 39 | 09 | 00 | 1B | 10 | 119 | 52 | 58 | 5E | 64 | 7C | 76 | 4F | 46 |
| 58 | 4A | 4E | 56 | 5C | 66 | 78 | 70 | 4B | 120 | A2 | A9 | AF | B8 | 88 | 83 | 9A | 93 |
| 59 | A2 | A9 | AF | B8 | 88 | 83 | 9A | 93 | 121 | 60 | 66 | 6B | 6E | 42 | 44 | 59 | 5C |
| 60 | F2 | F6 | F8 | FA | D3 | D1 | D6 | D7 | 122 | 22 | 29 | 2F | 39 | 08 | 00 | 1A | 10 |
| 61 | 22 | 29 | 2F | 38 | 08 | 03 | 1A | 13 | 123 | C5 | CB | D2 | D9 | ED | E7 | FC | F7 |
| 124 | A3 | AA | B0 | B9 | 89 | 80 | 9B | 90 | 191 | 2B | 30 | 39 | 3F | 01 | 1B | 10 | 6B |

FIGURE 5B

| | | | | | | | | | | | | | | | |
|---|---|---|---|---|---|---|---|---|---|---|---|---|---|---|---|
| 125 | 3A | 3F | 47 | 4E | 11 | 6A | 63 | 7A | 192 | A8 | AE | B6 | BD | 83 | 84 | 9D | 94 |
| 126 | 24 | 2B | 32 | 3A | 0F | 06 | 19 | 11 | 193 | AE | B6 | BD | C5 | 85 | 9D | 94 | ED |
| 127 | B1 | B9 | BF | C7 | 98 | 90 | EA | E0 | 194 | 25 | 2C | 33 | 3B | 0C | 06 | 1E | 16 |
| 128 | A7 | AD | B5 | BC | 8D | 87 | 9C | 97 | 195 | 35 | 3C | 43 | 4B | 1C | 17 | 6F | 67 |
| 129 | 2D | 33 | 3B | 42 | 07 | 1E | 16 | 6E | 196 | A3 | AA | B1 | BA | 8E | 81 | 98 | 91 |
| 130 | 2A | 2F | 38 | 3E | 00 | 05 | 13 | 15 | 197 | BE | C5 | CC | D3 | 95 | ED | E4 | FD |
| 131 | A9 | AF | B7 | BE | 80 | 85 | 92 | 95 | 198 | 22 | 29 | 30 | 39 | 09 | 00 | 1B | 10 |
| 132 | AD | B3 | BB | C2 | 87 | 9E | 96 | EE | 199 | 4E | 55 | 5B | 61 | 7B | 73 | 75 | 43 |
| 133 | 26 | 2D | 34 | 3C | 0D | 07 | 1F | 17 | 200 | A2 | A9 | AF | B8 | 88 | 83 | 9A | 93 |
| 134 | 32 | 39 | 3F | 48 | 19 | 10 | 6B | 60 | 201 | 6A | 6D | 70 | 75 | 58 | 5F | 52 | 50 |
| 135 | A4 | AB | B2 | BA | 8F | 81 | 99 | 91 | 202 | 22 | 29 | 2F | 38 | 08 | 00 | 1A | 13 |
| 136 | BA | BF | C8 | CE | 91 | EB | E0 | FB | 203 | C8 | CD | D4 | DB | E0 | E5 | F2 | F5 |
| 137 | 23 | 2A | 30 | 39 | 09 | 00 | 1B | 10 | 204 | A3 | AA | B0 | B9 | 89 | 80 | 9B | 90 |
| 138 | 47 | 4D | 54 | 5B | 63 | 65 | 72 | 75 | 205 | 3B | 40 | 48 | 4F | 16 | 68 | 60 | 78 |
| 139 | A2 | A9 | AF | B8 | 88 | 80 | 9A | 90 | 206 | 24 | 2B | 32 | 3A | 0F | 01 | 19 | 11 |
| 140 | E7 | EB | EF | F3 | C5 | D9 | DD | D3 | 207 | B2 | B9 | BF | C8 | 99 | 90 | E8 | E0 |
| 141 | 22 | 29 | 2F | 38 | 08 | 03 | 1A | 13 | 208 | A6 | AC | B4 | BC | 8D | 87 | 9F | 97 |
| 142 | CF | D6 | DC | E1 | F9 | F0 | CB | C0 | 209 | 2D | 34 | 3B | 42 | 04 | 1F | 16 | 6F |
| 143 | A2 | A9 | B0 | B9 | 89 | 80 | 9B | 90 | 210 | 29 | 2F | 37 | 3E | 00 | 05 | 12 | 15 |
| 144 | 3E | 45 | 4C | 53 | 15 | 6D | 64 | 7D | 211 | AA | AF | B8 | BE | 80 | 85 | 93 | 95 |
| 145 | 23 | 2A | 31 | 3A | 0E | 01 | 18 | 11 | 212 | AC | B3 | BB | C2 | 87 | 9E | 96 | EE |
| 146 | B6 | BC | C3 | CB | 9D | 97 | EF | E7 | 213 | 27 | 2D | 35 | 3C | 0D | 07 | 1C | 17 |
| 147 | A5 | AC | B3 | BB | 8C | 86 | 9E | 96 | 214 | 31 | 38 | 3F | 47 | 18 | 13 | 6A | 63 |
| 148 | 2F | 36 | 3D | 45 | 05 | 1D | 14 | 6D | 215 | A4 | AB | B2 | BB | 8F | 86 | 99 | 96 |
| 149 | 28 | 2E | 36 | 3D | 02 | 04 | 1D | 14 | 216 | B9 | BF | C7 | CE | 90 | EA | E3 | FA |
| 150 | AB | B0 | B9 | BF | 81 | 9B | 90 | EB | 217 | 23 | 2A | 30 | 39 | 09 | 00 | 1B | 10 |
| 151 | AB | B1 | B9 | BF | 86 | 98 | 90 | E8 | 218 | 45 | 4B | 51 | 59 | 6D | 67 | 7F | 77 |
| 152 | 28 | 2E | 36 | 3D | 02 | 04 | 1D | 14 | 219 | A2 | A9 | AF | B9 | 88 | 80 | 9A | 90 |
| 153 | 2F | 36 | 3D | 45 | 05 | 1D | 14 | 6D | 220 | DE | E4 | E9 | ED | CF | C6 | D8 | DC |
| 154 | A5 | AC | B3 | BB | 8C | 86 | 9E | 96 | 221 | 22 | 29 | 2F | 38 | 08 | 03 | 1A | 13 |
| 155 | B6 | BC | C3 | CB | 9D | 97 | EF | E7 | 222 | D3 | D9 | DF | E5 | FD | F7 | CC | C7 |
| 156 | 23 | 2A | 31 | 3A | 0E | 01 | 18 | 11 | 223 | A2 | A9 | B0 | B9 | 89 | 80 | 9B | 90 |
| 157 | 3F | 45 | 4C | 53 | 6A | 62 | 65 | 7D | 224 | 3F | 47 | 4D | 55 | 6B | 63 | 65 | 73 |
| 158 | A2 | A9 | B0 | B9 | 89 | 80 | 9B | 90 | 225 | 23 | 2A | 31 | 3A | 0E | 01 | 18 | 11 |
| 159 | D0 | D7 | DD | E2 | FE | F1 | C8 | C1 | 226 | B7 | BD | C4 | CC | 92 | 94 | EC | E4 |
| 160 | 22 | 29 | 2F | 38 | 08 | 03 | 1A | 13 | 227 | A5 | AC | B3 | BB | 8C | 86 | 9E | 96 |
| 161 | E5 | E9 | ED | F1 | C7 | DB | DF | D2 | 228 | 2F | 37 | 3E | 46 | 1A | 12 | 15 | 62 |
| 162 | A2 | A9 | AF | B9 | 88 | 80 | 9A | 90 | 229 | 28 | 2D | 36 | 3D | 02 | 04 | 1D | 14 |
| 163 | 46 | 4C | 53 | 5A | 63 | 64 | 7D | 74 | 230 | AB | B1 | BA | C0 | 86 | 98 | 91 | E8 |
| 164 | 23 | 2A | 30 | 39 | 09 | 00 | 1B | 10 | 231 | AB | B0 | B9 | BF | 81 | 9B | 90 | EB |
| 165 | BA | BF | C8 | CE | 91 | EB | E0 | FB | 232 | 28 | 2E | 36 | 3D | 03 | 04 | 1D | 14 |
| 166 | A4 | AB | B2 | BA | 8F | 81 | 99 | 91 | 233 | 2E | 35 | 3D | 44 | 05 | 1C | 14 | 6C |
| 167 | 32 | 39 | 3F | 48 | 19 | 10 | 6B | 60 | 234 | A6 | AC | B3 | BB | 8C | 86 | 9E | 96 |
| 168 | 26 | 2D | 34 | 3C | 0D | 07 | 1F | 17 | 235 | B5 | BB | C2 | CA | 9C | 96 | EE | E6 |
| 169 | AD | B3 | BB | C2 | 87 | 9E | 96 | EE | 236 | 24 | 2A | 31 | 3A | 0E | 01 | 18 | 11 |
| 170 | A9 | AF | B7 | BE | 80 | 85 | 92 | 95 | 237 | 3D | 44 | 4B | 52 | 14 | 6C | 67 | 7C |
| 171 | 29 | 2F | 38 | 3E | 00 | 05 | 13 | 15 | 238 | A2 | A9 | B0 | B9 | 89 | 80 | 9B | 90 |
| 172 | 2D | 33 | 3B | 42 | 07 | 1E | 16 | 6E | 239 | CD | D3 | DA | DF | E5 | FD | F4 | CD |
| 173 | A7 | AD | B4 | BC | 8D | 87 | 9C | 97 | 240 | 22 | 29 | 2F | 38 | 08 | 03 | 1A | 13 |
| 174 | B1 | B9 | BF | C8 | 99 | 90 | EB | E0 | 241 | EF | F2 | F6 | F8 | DD | D3 | D1 | D6 |
| 175 | 24 | 2B | 32 | 3A | 0F | 01 | 19 | 11 | 242 | A2 | A9 | AF | B8 | 88 | 83 | 9A | 93 |
| 176 | 3A | 3F | 48 | 4E | 11 | 6B | 60 | 7A | 243 | 49 | 4E | 56 | 5C | 61 | 7B | 70 | 4B |
| 177 | A3 | AA | B0 | B9 | 89 | 80 | 9B | 90 | 244 | 22 | 2A | 30 | 39 | 09 | 00 | 1B | 10 |
| 178 | C6 | CC | D2 | DA | E2 | E4 | FC | F4 | 245 | BB | C1 | C9 | CF | 96 | E9 | E1 | F9 |
| 179 | 22 | 29 | 2F | 39 | 08 | 00 | 1A | 10 | 246 | A4 | AB | B2 | BA | 8E | 81 | 99 | 91 |
| 180 | 62 | 67 | 6C | 6F | 40 | 5A | 5E | 5D | 247 | 33 | 3A | 40 | 49 | 1E | 11 | 68 | 61 |
| 181 | A2 | A9 | AF | B8 | 88 | 83 | 9A | 93 | 248 | 26 | 2C | 34 | 3C | 0D | 07 | 1F | 17 |
| 182 | 51 | 58 | 5D | 63 | 7F | 76 | 49 | 41 | 249 | AD | B4 | BC | C3 | 84 | 9F | 97 | EF |
| 183 | 22 | 29 | 30 | 39 | 09 | 00 | 1B | 10 | 250 | A9 | AE | B7 | BE | 83 | 85 | 92 | 95 |
| 184 | BF | C6 | CD | D4 | EA | E2 | E5 | F2 | 251 | 2A | 2F | 38 | 3F | 00 | 1A | 13 | 6A |
| 185 | A3 | AA | B1 | BA | 8E | 81 | 98 | 91 | 252 | 2C | 32 | 3B | 41 | 07 | 19 | 16 | 69 |
| 186 | 36 | 3C | 44 | 4B | 1D | 17 | 6C | 67 | 253 | A7 | AD | B5 | BC | 8D | 87 | 9C | 97 |
| 187 | 25 | 2C | 33 | 3B | 0C | 06 | 1E | 16 | 254 | B0 | B8 | BF | C7 | 9B | 93 | EA | E3 |
| 188 | AF | B6 | BD | C5 | 85 | 9D | 94 | ED | 255 | 25 | 2B | 32 | 3B | 0F | 06 | 19 | 16 |
| 189 | A8 | AE | B6 | BD | 82 | 84 | 9D | 94 | 256 | 39 | 3E | 46 | 4D | 10 | 15 | 62 | 65 |

FIGURE 5C

| 190 | 2B | 31 | 39 | 40 | 06 | 18 | 10 | 68 | 257 | A3 | AA | B1 | B9 | 89 | 80 | 9B | 90 |
|---|---|---|---|---|---|---|---|---|---|---|---|---|---|---|---|---|---|
| 258 | C3 | CA | D0 | D8 | EC | E6 | FE | F6 | 279 | 4C | 51 | 59 | 5E | 64 | 7F | 77 | 4F |
| 259 | 22 | 29 | 2F | 39 | 08 | 00 | 1B | 10 | 280 | A2 | A9 | AF | B8 | 88 | 83 | 9A | 93 |
| 260 | 5C | 60 | 67 | 6C | 4B | 42 | 45 | 5E | 281 | 77 | 79 | 7B | 7C | 56 | 56 | 57 | 54 |
| 261 | A2 | A9 | AF | B8 | 88 | 83 | 9A | 93 | 282 | 22 | 29 | 2F | 38 | 08 | 03 | 1A | 13 |
| 262 | 56 | 5B | 60 | 67 | 70 | 75 | 42 | 45 | 283 | CA | CF | D7 | DD | E6 | F8 | F1 | C8 |
| 263 | 22 | 29 | 30 | 39 | 08 | 00 | 1B | 10 | 284 | A2 | AA | B0 | B9 | 89 | 80 | 9B | 90 |
| 264 | C0 | C8 | CE | D6 | E9 | E0 | FB | F0 | 285 | 3C | 42 | 4A | 4F | 17 | 6E | 66 | 79 |
| 265 | A3 | AA | B1 | BA | 8E | 81 | 98 | 91 | 286 | 24 | 2B | 32 | 3A | 0E | 01 | 19 | 11 |
| 266 | 37 | 3D | 45 | 4C | 12 | 14 | 6D | 64 | 287 | B3 | BA | C1 | C9 | 9E | 91 | E9 | E1 |
| 267 | 25 | 2B | 33 | 3B | 0F | 06 | 1E | 16 | 288 | A6 | AC | B4 | BC | 8C | 87 | 9F | 97 |
| 268 | AF | B7 | BE | C6 | 9A | 92 | 95 | E2 | 289 | 2E | 34 | 3C | 43 | 04 | 1F | 17 | 6F |
| 269 | A7 | AD | B5 | BD | 82 | 84 | 9C | 94 | 290 | 29 | 2E | 37 | 3E | 03 | 05 | 12 | 15 |
| 270 | 2C | 31 | 3A | 40 | 06 | 18 | 11 | 68 | 291 | AA | AF | B8 | BF | 81 | 9A | 93 | EA |
| 271 | 2A | 30 | 39 | 3F | 01 | 1B | 10 | 6B | 292 | AC | B2 | BA | C1 | 86 | 99 | 91 | E9 |
| 272 | A8 | AE | B6 | BE | 83 | 85 | 9D | 95 | 293 | 27 | 2D | 35 | 3D | 02 | 04 | 1C | 14 |
| 273 | AE | B5 | BC | C4 | 84 | 9C | 97 | EC | 294 | 30 | 38 | 3E | 46 | 1B | 13 | 15 | 63 |
| 274 | 26 | 2C | 34 | 3C | 0C | 07 | 1F | 17 | 295 | A5 | AB | B3 | BB | 8F | 86 | 9E | 96 |
| 275 | 34 | 3B | 42 | 4A | 1F | 16 | 6E | 66 | 296 | B8 | BE | C6 | CD | 93 | 95 | E2 | E5 |
| 276 | A4 | AA | B1 | BA | 8E | 81 | 98 | 91 | 297 | 23 | 2A | 31 | 39 | 09 | 00 | 18 | 10 |
| 277 | BD | C3 | CB | D1 | 94 | EF | E7 | FF | 298 | 42 | 49 | 4F | 57 | 6E | 61 | 79 | 71 |
| 278 | 22 | 29 | 30 | 39 | 09 | 00 | 1B | 10 | 299 | A2 | A9 | B0 | B9 | 88 | 80 | 9B | 90 |
|  |  |  |  |  |  |  |  |  | 300 | D9 | DE | E4 | EA | F4 | CF | C6 | D8 |

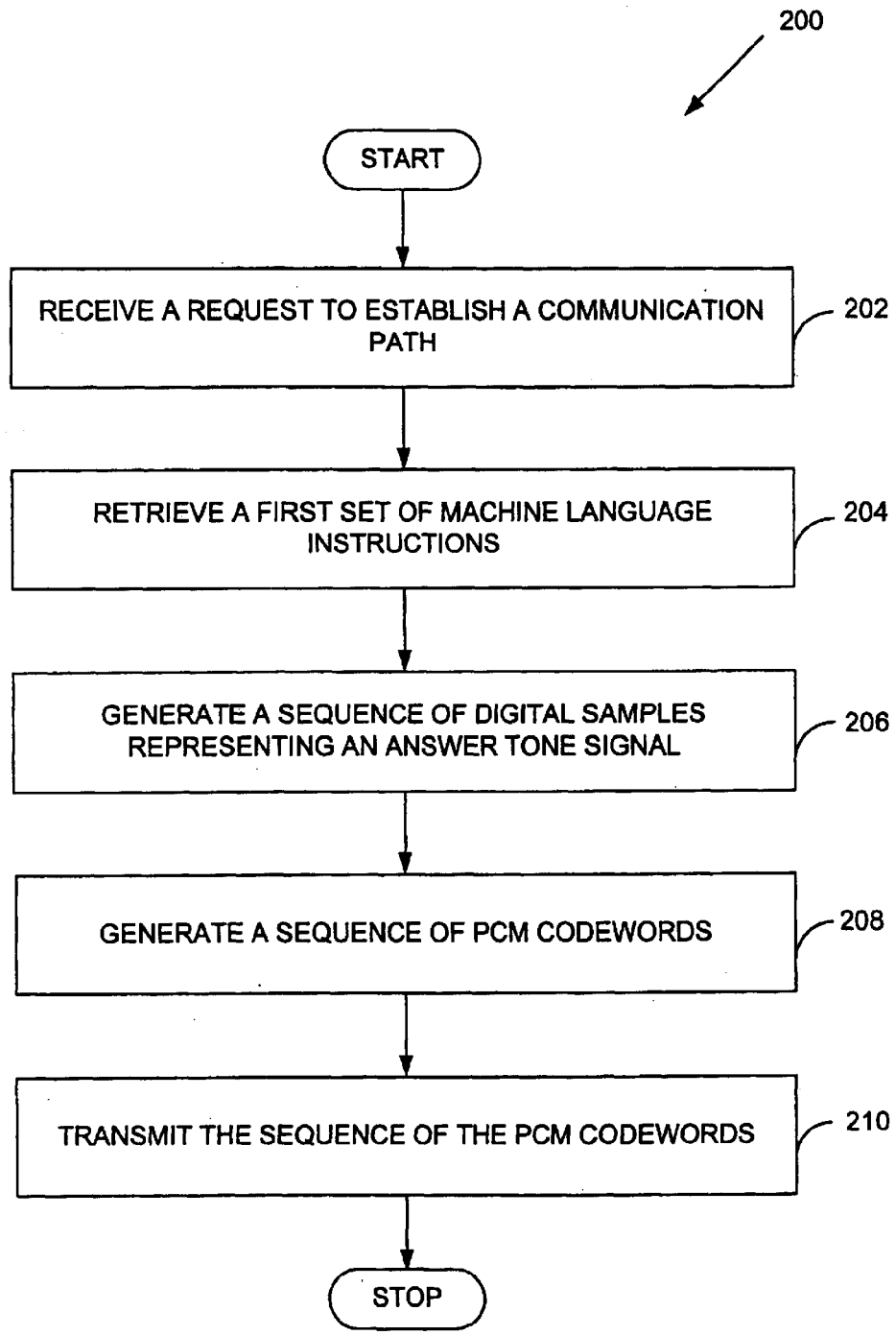

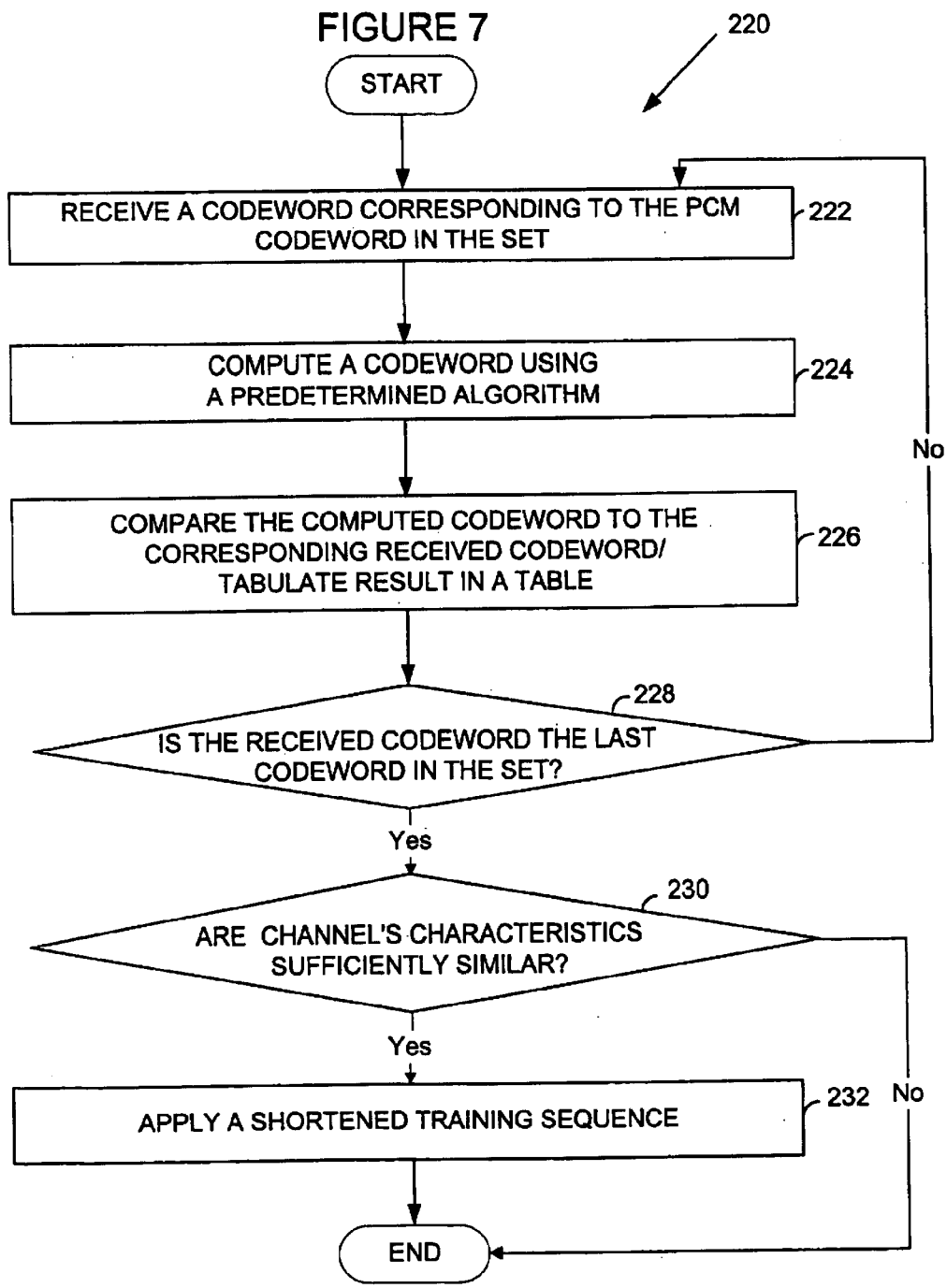

METHOD AND SYSTEM FOR ANALYTICALLY COMPUTING AND USING AN ANSPCM SIGNAL

REFERENCE TO RELATED APPLICATIONS

The inventors claim priority to U.S. Provisional Patent Application No. 60/166,637, filed Nov. 19, 1999, the entirety of which is hereby incorporated by reference.

FIELD OF THE INVENTION

The present invention relates to telecommunications and more particularly to a method and system for analytically generating and dynamically employing a repeatable digital probing signal representing an answer tone. The probing signal may conveniently be used by a modem to determine whether the characteristics of the communication path between the modem and another end are sufficiently similar to these of a previous communication path, such that a shortened training sequence can be employed between the two ends.

BACKGROUND OF THE INVENTION

Before two modems can begin to communicate over a communications channel, the modems must first confirm that an adequate connection exists and establish mutually acceptable ground rules for communication. To do so, when a connection is first established between the modems, the modems will engage in a "training sequence" designed to both test the characteristics of the telephone circuit and select an agreed communication protocol. The training sequence is often referred to as "handshaking," by analogy to the human "handshake" that commonly occurs before two people begin to communicate with each other.

The modem handshaking sequence is particularly important, because numerous different modulation protocols or standards exist (defining aspects such as the "handshake method" (XON/XOFF), the baud rate, the parity setting, the number of data bits, and the number of stop bits), and the modems need to establish up front which protocol will be used. Further, the line conditions may preclude or require the use of one or more protocols or protocol-settings, and the modem handshaking sequence can be used to measure those line characteristics and facilitate a determination of what limitations or requirements exist.

1. Exemplary Modem Training Sequence

To initiate communication between two modems on a common telephone circuit, the originating modem first places a call to the answering modem, usually by dialing the phone number of the answering modem over the public switched telephone network (PSTN). The answering modem detects a ring on the telephone line and responsively goes off-hook to answer the call. The answering modem then begins the modem handshaking sequence. By convention, the answering modem begins this handshaking sequence by sending an answer tone of a predefined frequency to the originating modem, which may specify in simple terms (typically by its presence only) a proposed modulation protocol.

An answer tone was originally included in the handshaking protocol so as to disable echo suppressors and echo cancellers in the telephone network. However, as different modulation protocols have evolved, characteristics of the answer tone have been used to identify the presence of specific protocols. By way of example, phase reversals in the answer tone may serve to identify v.32 and v.34 echo-cancelled modems.

According to traditional analog modem communication protocols, such as V.32 and V.34, when the originating modem recognizes the answer tone, it responsively turns on its own transmitter and sends an originating mark carrier of a predefined frequency to the answering modem to confirm its availability to communicate according to the specified protocol. Alternatively, the originating modem may negotiate for the use of some other mutually acceptable protocol. Once the two modems agree on a modulation standard and once they have completed training, the modulated communication of useful information may begin.

According to more recent digital transmission protocols, the "training sequence" may take on other functions. For instance, according to the V.90 standard, after the answering modem sends the answer tone to the originating modem, the modems engage in several stages of a startup sequence, including (i) V.8 or V.8bis negotiation to identify V.90 capabilities and modes of operation (e.g., data mode, text mode, and modulation mode), (ii) line-probing to determine if the telephone circuit can support V.90 transmissions, (iii) training of equalizers and echo cancellers and testing the line for distortion, and (iv) exchange of constellation coding information to facilitate communication. The functions and operation of this training process are well known to those of ordinary skill in the art and need not be described in great detail here.

In general, during the line-probing stage, the originating modem and the answering modem transmit to each other probing signals that are made up of complex signals. When each modem receives the probing signal, it may analyze the signal in order to determine characteristics of the subscriber line. Based at least in part on these characteristics, the two modems can then determine whether a V.90 compatible connection is possible or whether a different protocol, such as V.34 or V.32 should be employed instead.

Further, based on an analysis of the respective probing signals that they receive, either or both modems may adjust various operating parameters, in order to optimize communication. As a result, for instance, the modems may adjust the carrier frequency and symbol rates that the modems use for signal transmission. As another example, the modems may engage in an adaptive pre-emphasis process in order to adjust (e.g., spectrally shape) various parts of the signal being transmitted so as to reduce effects of signal-dependent distortion. As still another example, the modems may engage in an adaptive power-control process so as to increase transmission power and increase the signal-to-noise ratio (preferably without introducing substantial echo distortions).

After line probing, the modems train equalizers and echo-cancellers and make measurements (such as signal levels and quantization distortions) that enable one or both modems to determine what impact if any the communication link between the modems has on digital transmissions. This latter procedure is known in the art as a "Digital Impairment Learning" or DIL, and it is commonly used in V.90 compatible communication systems, in which one communication end is terminated with a digital modem and a second communication end is terminated with an analog modem. In a V.90 compatible communication system, a digital modem typically transmits a DIL signal to an analog modem, which receives and processes the DIL signal.

To initiate the DIL process, the analog modem transmits to the digital modem a signal describing a sequence of codewords that the analog modem expects to receive. The description of the sequence of codewords is known as a DIL-descriptor, and the signal is known as a "Ja" signal. When the digital modem receives the "Ja" signal and builds the DIL sequence described by the DIL-descriptor in the "Ja" signal, the digital modem repeatedly transmits to the analog modem the DIL sequence that the analog modem expects to receive.

A DIL-sequence may be vendor-specific; no particular sequence is required by the standards. Thus, for example, of the 128 possible unique 8-bit PCM codewords, the DIL sequence could consist of 117 unique PCM codewords. A predefined signal, such as an "S/Sbar" signal, can then signify the end of the "Ja" signal (and the beginning of the next phase of the training sequence). In general, the "S" signal is a simple predefined signal consisting of two alternating signal points that are 90 degrees apart, and the "Sbar" signal is a signal generated by phase shifting the "S" signal by 180 degrees. The "S" signal and the "Sbar" signal are defined in the V.34 International Telecommunication Union-Telecommunication ("ITU-T") standard, which is incorporated herein by reference.

When the digital modem receives the "Ja" signal, the digital modem transmits the DIL sequence described by the DIL-descriptor in the "Ja" signal. Then, when the analog modem receives the codewords of the DIL sequence, the analog modem can collect and store the corresponding amplitudes in a table of 128 rows by 6 columns. Each row of the table may correspond to a particular PCM codeword of the DIL sequence, and each column of the table may correspond to a particular phase in which the symbol was received by the analog modem. Based on some or all entries in this table, the analog modem may then perform DIL processing in a number of stages. For instance, the analog modem might be arranged to perform the DIL processing in two stages.

First, the analog modem seeks to determine what encoding law (e.g., $\mu$-law or A-law) the digital end used to generate the PCM codewords that it transmitted and the extent to which the communications link digitally attenuated the signal. To do this, the analog modem formulates a hypotheses as to what scaling factors the line applied to the signal, and the analog modem then tests the hypotheses by decoding, the values in the table, first with a scaled $\mu$-law compander and then with a scaled A-law compander. The analog modem then compares each decoded value to the value that it expected to have been transmitted by the digital modem and thereby derives a decoding error for each value. A combination of the decoding errors for some or all of the received codewords provides a measure of veracity of the original hypotheses. By performing this process over a number of different hypotheses, each representing a respective scaling value, the analog modem can identify the encoding law and a scaling value that produces the least error and, thus, the analog modem can select a winning hypothesis.

Second, after receiving all of PCM codewords of the DIL sequence, the analog modem maps the transmitted codewords (i.e. expected codewords) with the received codewords. In particular, for instance, the analog modem can generate a number of bitmaps representing the transmitted and respective received codewords. The analog modem may then select a subset of transmitted codewords that maximizes the Euclidean distance between received values and that matches the noise ratio of the channel and the desired error rate. The analog modem may perform this process for several phases and then, in the final stage of the training sequence, may transmit the subsets to the digital modem.

In typical practice, the entire modem training sequence takes on the order of twenty to thirty seconds to complete. During this time, the modems do not communicate user data. Therefore, it is desirable to reduce the length of the modem training sequence.

2. Proposed Technique to Shorten the Training Sequence

In many environments, such as in accessing an Internet Service Provider (ISP), a network device such as an analog modem typically establishes a connection with an answering modem over the same subscriber line every time that it connects with the answering modem. Consequently, information that the originating modem and the answering modem obtain about the characteristics of that line during an initial training sequence may be equally applicable in later communication sessions. In a given communication session, if one of the modems can somehow determine that the transmission line characteristics are substantially the same as they were in a previous session, the modems should theoretically be able to cut short the training sequence, omitting some or all of the lengthy line-characteristic analysis described above.

According to a method proposed by Conexant Systems Inc., one way to determine whether a shortened training sequence can be employed is to effectively superimpose a line probing signal on the answer tone that the digital modem initially sends to the analog modem. Conexant refers to this combination signal as an "ANSpcm signal."

More particularly, according to Conexant, the digital modem retrieves from a stored table and transmits to the analog modem a sequence of 320 predefined PCM codewords (consisting of 70 unique codewords) that represent the answer tone signal. Concurrent with its receipt of the answer tone, the analog modem may then compare the received codewords with a stored table of the predefined 320 PCM codewords and, as in the DIL process described above, determine the characteristics of the line.

In this way, the analog modem can effectively kill two birds with one stone: (i) it can receive the answer tone and, simultaneously, (ii) receive a probing signal that allows it to learn the line characteristics so that it can determine whether the connection is the same as before. If the line characteristics are the same as before, the analog modem can then use the same receiver settings, without having to engage in the full training sequence. The modems can then more quickly enter a useful communication session.

SUMMARY OF THE INVENTION

While Conexant's proposal provides a useful mechanism for determining whether line characteristics are the same as a previous connection and therefore whether the training sequence can be shortened, carrying out the proposal in practice can be burdensome. In particular, the proposal effectively requires both the analog and digital modems to maintain a table of all 320 predefined PCM codewords. The digital modem needs to maintain the table in order to retrieve the codewords that it will send to the analog modem. And the analog modem needs to maintain the table in order to compare the received codewords with the predefined codewords. Moreover, any variation in the set of codewords, such as scaling the encoded values, for instance, could require both ends to have multiple tables of codewords, such as one table corresponding to each scaling factor. As a result, the Conexant method unfortunately consumes valuable memory storage space.

Further, the predefined sequence of 320 PCM codewords proposed by Conexant is designed to very closely approximate a frequency of 2100 Hz, the frequency of the answer tone required by the V.90 standard. To achieve this approximation, however, Conexant intentionally adds low-level noise to a 2100 Hz tone at 25 Hz spacing, thereby decreasing the effective signal-to-noise ratio to 20 dB. Conexant's proposal then calls for quantizing and claw encoding the signal to produce the 320 codewords. Thus, the static set of 320 codewords proposed by Conexant unfortunately results in raising the noise floor of the answer tone.

The present invention facilitates derivation of an ANSpcm sequence analytically and dynamically, without the need to store a predefined sequence of codewords in valuable memory space (although not precluding the use of a table either). Still further, according to an exemplary embodiment, the present invention enables dynamic generation of an ANSpcm sequence without unduly raising the noise floor of the answer tone represented by the sequence. Therefore, the invention overcomes deficiencies of the prior art.

In an exemplary embodiment of the invention, a first modem can be programmed with a predefined algorithm that allows the modem to dynamically generate a predefined sequence of codewords representing an answer tone of a predefined frequency. The first modem may transmit those codewords over a communication link to a second modem, which may receive the sequence, conclude that the sequence represents an answer tone, and analyze the codewords to determine whether the line characteristics are the same as in a previous connection, go as to justify employing a shortened training sequence.

In particular, upon receipt of the codewords that arrive, the second modem can apply the same predefined algorithm so as to dynamically generate the codewords of the predefined sequence. The second modem may then compare the codewords that it receives with the dynamically generated codewords so as to measure line characteristics. In turn, the second modem may then determine whether the measured line characteristics are substantially the same as the line characteristics that were present in a previous connection. If so, the modem may then conclude that a shortened training sequence is appropriate.

Thus, in one respect, a modem may apply a predetermined algorithm so as to generate a set of codewords cooperatively representing an analog answer tone signal. In an exemplary embodiment, the modem may transmit the generated set of codewords to another modem, which, upon receiving the codewords, may generate the analog answer tone signal. Further, in the exemplary embodiment the receiving modem may determine whether each received codeword is an expected codeword and, in turn, whether a shortened training sequence may be employed.

In an exemplary embodiment, the receiving modem may determine whether the shortened training sequence may be employed by: (i) decoding each received codeword to produce a respective sample value, (ii) for each sample value corresponding to the decoded codeword, applying a second predetermined algorithm to generate a respective sample value and a respective codeword, (iii) computing an error value for each sample value corresponding to the decoded codeword and the respective sample value generated using the second predetermined algorithm, and (iv) comparing each received codeword to the respective codeword. Thus, using the computed error values and comparison results of received codewords and respectively generated codewords, the receiving modem may determine whether the shortened training sequence may be employed.

In another respect, the invention may take the form of a network device such as a modem. The modem may include a processor, a data storage medium and a line interface unit. The data storage medium may store a plurality of machine language instructions. A first set of machine language instructions, for instance, may be executable by the processor to generate a first set of codewords cooperatively representing an analog answer tone signal. In turn, the line interface unit may transmit the first set of codewords onto a transmission line and, also, may receive from the transmission line a second set of codewords. The data storage medium may also include a second set of machine language instructions, which when executed by the processor may be used by the processor to determine with respect to each codeword received from the transmission line whether the received codeword is an expected codeword. Further, using the second set of machine language instructions, the processor may conclude that a shortened training sequence may be employed by the modem.

These as well as other aspects and advantages of the present invention will become apparent to those of ordinary skill in the art by reading the following detailed description, with reference where appropriate to the accompanying drawings.

BRIEF DESCRIPTION OF THE DRAWINGS

An exemplary embodiment of the present invention is described below with reference to the drawings, in which:

FIG. 5 is a table of the ANSpcm sequence of codewords generated for the ratio A/B=301/79;

FIG. 6 is a flow chart illustrating a method for generating and transmitting a sequence of the ANSpcm codewords; and FIG. 7 is a flow diagram illustrating a method for determining whether a shortened training sequence may be employed.

DETAILED DESCRIPTION OF AN EXEMPLARY EMBODIMENT

Figure 1:
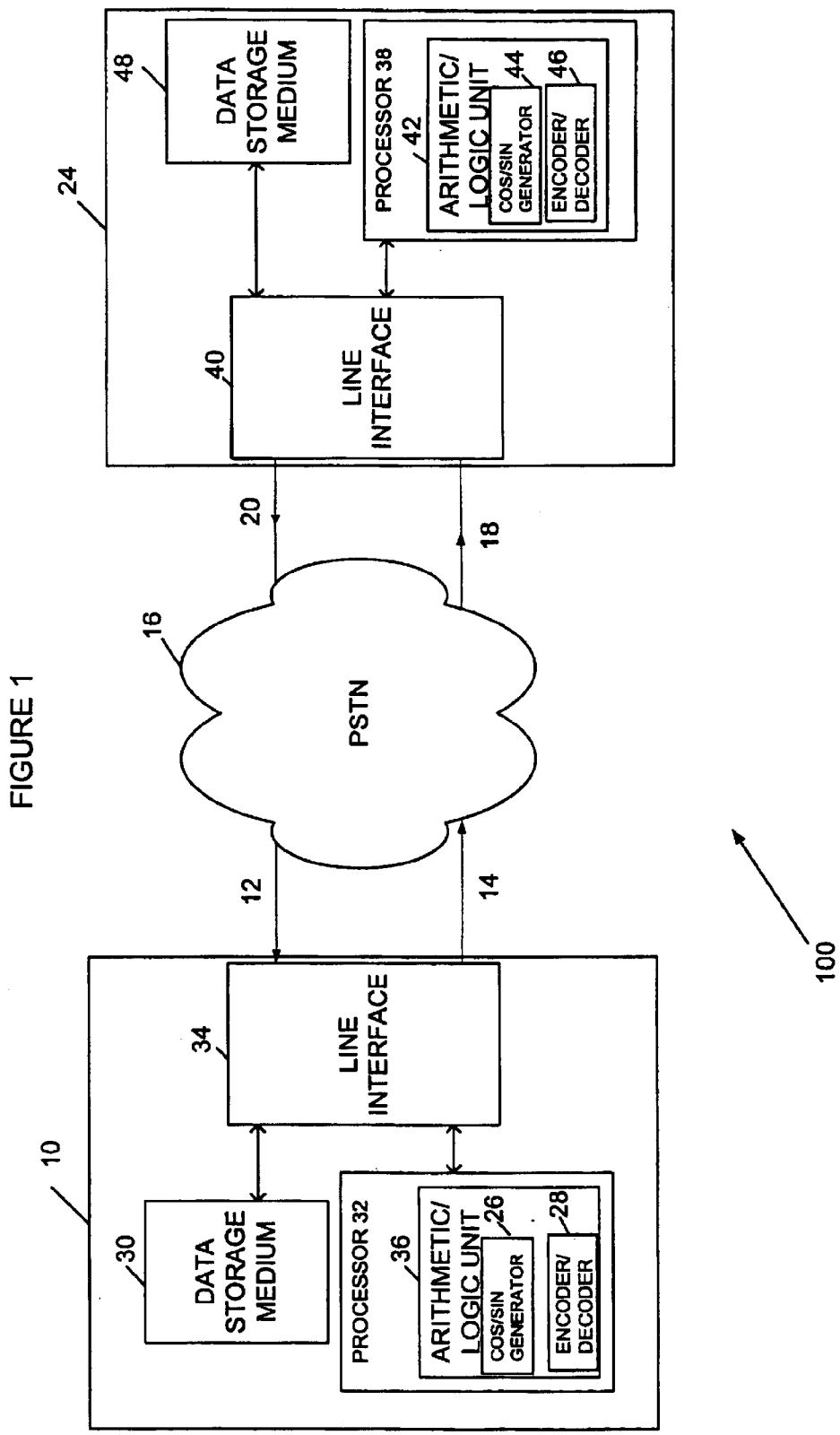
FIG. 1 is a block diagram illustrating a system employing an exemplary embodiment of the present invention.

Referring to the drawings, FIG. 1 is a block diagram illustrating a communications system 100 arranged to employ an exemplary embodiment of the present invention. As shown in FIG. 1, a first modem 10 communicates with a second modem 24 via a telecommunications network 16. The first modem 10 may be a digital modem, capable of sending and receiving signals representing digital bit streams, and the second modem 24 may be an analog modem, designed to send and receive analog waveforms, but either modem may take other forms as well. Network 16 may be a wide area network (WAN) such as the PSTN or could take other forms.

In the exemplary embodiment, each of the modems 10, 24 includes a processor that includes an arithmetic/logic unit with a cosine/sine generator and an encoder. In the exemplary embodiment shown in FIG. 1, modem 10 includes a processor 32, an arithmetic/logic unit 36 with a cosine/sine generator 26 and an encoder 28. Similarly, modem 24 includes a processor 38, a arithmetic/logic unit 42 with a cosine/sine generator 44 and an encoder 46. The cosine/sine generators 26 and 44 are arranged to compute periodic waveform functions such as cosine and/or sine. The encoders 28 and 46 are preferably PCM encoders such as μ-law and/or A-law encoders 28 and 46 but could take other forms.

Each modem also preferably includes a data storage medium as well as a line interface unit for communicating signals over network 16 or other communication link. In the exemplary embodiment, modem 10 includes a data storage medium 30 and a line interface unit 34, and modem 24 includes a data storage medium 48 and a line interface unit 40. Each data storage medium 34, 48 can be an optical, magnetic or other memory or archive device (such as RAM, EPROM, EEPROM, or Flash memory), for instance.

Among other functions, the data storage medium in each modem preferably stores a plurality of machine language instructions that are executable by the processor in the modem to carry out functions described herein. One such set of machine language instructions could define a predetermined algorithm executable by the arithmetic/logic of the modem to dynamically generate a sequence of samples cooperatively representing a desired answer tone signal. Further, another set of machine language instructions could define logic that allows the arithmetic/logic unit to dynamically determine whether to employ a shortened training sequence.

Each of the modems 10, 24 will typically include other functional components as well, such as modulators, demodulators, equalizers, amplifiers, buffers, filters, etc. These components are well known to those of ordinary skill in the art and therefore are not described here.

In an exemplary arrangement as shown in FIG. 1, each modem communicates along both communication paths via network 16. FIG. 1 shows modem 10 having a transmit path 14 and receive path 12 and modem 24 having a transmit path 20 and receive path 18. In practice, each modem can be coupled with the PSTN by a conventional link such as a pair of copper wires for instance, and therefore each modem may effectively sit on the PSTN. Paths 12, 14, 18 and 20 are shown for illustrative purposes only.

Modems 10 and 24 are each preferably arranged to operate according to one or more common communication protocols, such as V.32, V.34, V.90 or better, so as to facilitate communication between the modems. For communication according to the V.90 protocol, at least one of the modems might send a digital signal into network 16, and the signal would remain in digital form until it reaches a termination circuit such as for a T1, PRI or BRI circuit.

In an exemplary embodiment, modem 24 could be a modem attached to a personal computer for instance, and modem 10 could be one of many modems owned and operated by an Internet Service Provider (ISP). Modem 10 may, for instance, be incorporated as part of a remote access server that provides connectivity with the Internet or other network. Examples of V.90 compatible remote access servers are available from 3Com Corporation under the brand names U.S. Robotics MP I-modem, NETServer I-modem, Courier I-modem, SuperStack II Remote Access System 1500, and Total Control remote access concentrator, for instance.

1. Generation of the ANSpcm Signal

According to an exemplary embodiment of the invention, when modem 24 initiates a call to modem 10 (for instance), modem 10 responds with an answer tone. According to Recommendation G.164 of the International Telecommunications Union (ITU), the answer tone should be a 2100 Hz sinusoid with a±15 Hz frequency tolerance. The present invention should not necessarily be restricted to use in connection with an answer tone of this particular frequency range, but an exemplary embodiment of invention meets the recommended range.

According to the exemplary embodiment, the 2100 Hz±15 Hz sinusoid can be represented by a sequence of PCM codewords that can be analytically and dynamically generated. Conveniently, these codewords can be used concurrently with transmission of the answer tone as a probing signal, to facilitate a determination of whether line characteristics are substantially the same as they were in a previous connection, so that a shortened training sequence would be appropriate.

It would be best if the analytically-derived PCM codewords that define the sequence representing the answer tone would include a maximum (or at least a large number) of unique codewords. With more unique codewords, it should become easier for a processor to distinguish line characteristics and make a reasoned decision as to whether the line characteristics seem to be the same as they were in a previous connection.

Given an 8,000 Hz sample rate as used for V.90 in a direction from a digital end to an analog end (for instance), the number of samples required to represent a 2100 Hz answer tone can be determined using the following formula:

8000 samples/second÷2100 cycles/second=80 samples per 21 cycles, where 80 and 21 are mutually prime numbers. Therefore, using a cosine/sine generator, 80 unique samples can be generated for 21 complete cycles of the 2100 Hz sine wave.

Unfortunately, however, when these 80 unique samples are μ-Law encoded, the samples result in only 24 unique PCM codewords, ignoring the sign bit. The remaining 56 codewords are duplicates of the 24 unique codewords. A richer ANSpcm signal is desired, in order to more fully analyze the characteristics of the current transmission channel.

Fortunately, according to ITU Recommendation G.164, the answer tone does not need to be exactly 2100 Hz. Rather, the answer tone can be shifted up or down by up to 15 Hz. The exemplary embodiment of the present invention leverages this frequency tolerance. In particular, with this frequency tolerance, the number of samples A per number of cycles B becomes range-bounded as follows:

$$8000 \div (2100 + \epsilon_{max}) \leq A/B \leq 8000 \div (2100 - \epsilon_{max})$$

where $\epsilon_{max}$ represents a maximum frequency deviation tolerance. In order to allow a lookup-table approach (although that approach is not preferred), the values of A and B may be confined to relatively prime integers.

There can be an infinite number of solutions to the above equation. Given A and B, the frequency of the approximated answer tone is $$f_{ans} = 8000 \times B/A = 2100 + \epsilon \text{ Hz.}$$

where $\epsilon$ is the frequency deviation from 2100 Hz for the A and B pair. Although not critical, Table 1 restricts the number of samples A to at most 320 (i.e., A≦320) and restricts the frequency deviation to at most 7.5 Hz ($\epsilon_{max}$=7.5 Hz). The frequency deviation of 7.5 Hz is half of the actual allowed tolerance of 15 Hz, so as to provide an added margin of safety.

TABLE 1

| A/B | ε [Hz] |
|---|---|
| 19/5 | 5.2632 |
| 42/11 | −4.7619 |
| 61/16 | −1.6393 |
| 80/21 | 0 |
| 99/26 | 1.0101 |
| 103/27 | −2.9126 |
| 107/28 | −6.5421 |
| 118/31 | 1.6949 |
| 137/36 | 2.1898 |
| 141/37 | −0.7092 |
| 145/38 | −3.4483 |
| 149/39 | −6.0403 |
| 156/41 | 2.5641 |
| 164/43 | −2.4390 |
| 172/45 | −6.9767 |
| 175/46 | 2.8571 |
| 179/47 | 0.5587 |
| 187/49 | −3.7433 |
| 191/50 | −5.7592 |
| 194/51 | 3.0928 |
| 202/53 | −0.9901 |
| 205/54 | 7.3171 |
| 213/56 | 3.2864 |
| 217/57 | 1.3825 |
| 221/58 | −0.4525 |
| 224/59 | 7.1429 |
| 225/59 | −2.2222 |
| 229/60 | −3.9301 |
| 232/61 | 3.4483 |
| 233/61 | −5.5794 |
| 237/62 | −7.1730 |
| 243/64 | 6.9959 |
| 248/65 | −3.2258 |
| 251/66 | 3.5857 |
| 255/67 | 1.9608 |
| 256/67 | −6.2500 |
| 259/68 | 0.3861 |
| 262/69 | 6.8702 |
| 263/69 | −1.1407 |
| 267/70 | −2.6217 |
| 270/71 | 3.7037 |
| 271/71 | −4.0590 |
| 275/72 | −5.4545 |
| 278/73 | 0.7194 |
| 279/73 | −6.8100 |
| 281/74 | 6.7616 |
| 286/75 | −2.0979 |
| 289/76 | 3.8062 |
| 293/77 | 2.3891 |
| 300/79 | 6.6667 |
| 301/79 | −0.3322 |
| 302/79 | −7.2848 |
| 308/81 | 3.8961 |
| 313/82 | −4.1534 |
| 316/83 | 1.2658 |
| 317/83 | −5.3628 |
| 319/84 | 6.5831 |

For each of the ratios in Table 1, the cosine generator 26 may compute A unique samples that form B complete cycles of a 2100+ε Hz signal. The following description will consider an A/B ratio of 19/5, for purposes of analytically generating a sequence of PCM codewords representing an answer tone signal. However, the invention can extend to use of other A/B ratios to as well.

Figure 2:
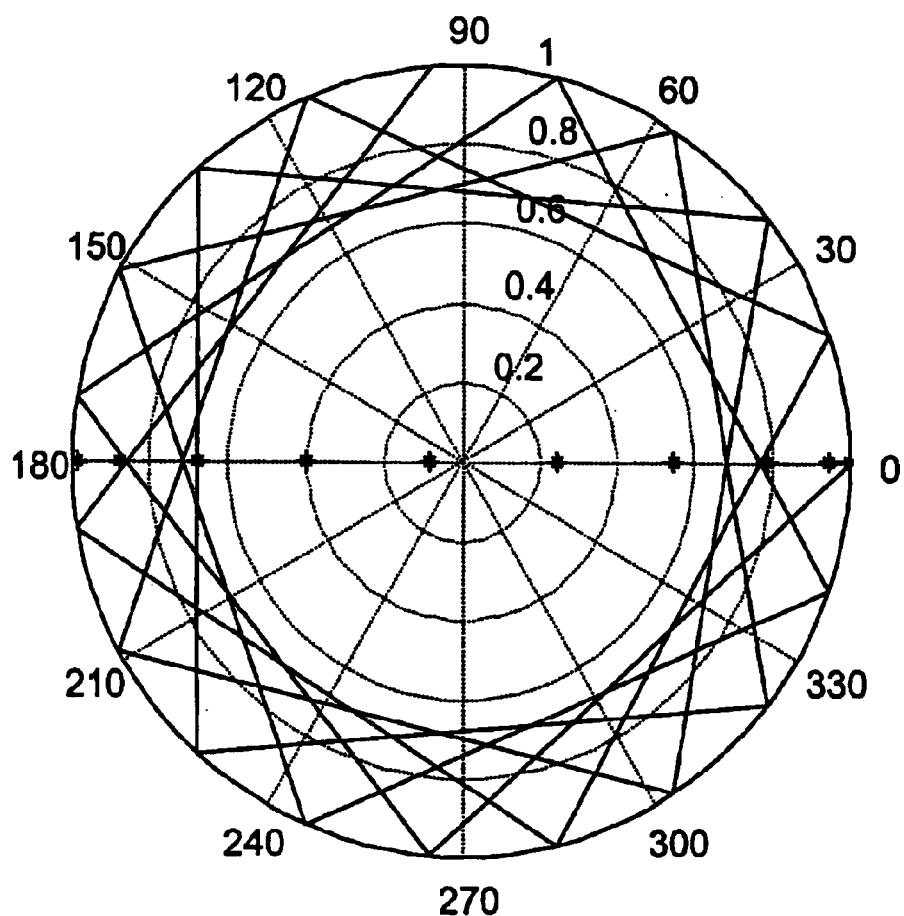
FIG. 2 is a polar plot illustrating generation of answer tone samples using a method of angular progression for a ratio A/B=19/5.

FIG. 2 shows a polar plot illustrating how a set of samples can be generated using a method of angular progression and the ratio A/B=19/5. On this polar plot, an angular progression vector begins on a unit circle just after the 90 degree marker and circles around 5 times using 19 points on the circle. Consequently, the transmit samples may be computed by a cosine generator by taking the projection of these points onto the horizontal axis.

By transmitting the resulting samples at 8000 samples per second, the resulting signal is 2105.2632 Hz, with a frequency deviation ε of 5.2632 as shown in Table 1. However, projection of 19 points onto the horizontal axis results in the overlap of the points from the top hemisphere with points from the bottom hemisphere. Thus, although the points around the circle are unique, the number of unique samples is reduced by a factor of about one half. Therefore, FIG. 2 shows 10 unique samples on the horizontal axis.

Figure 3:
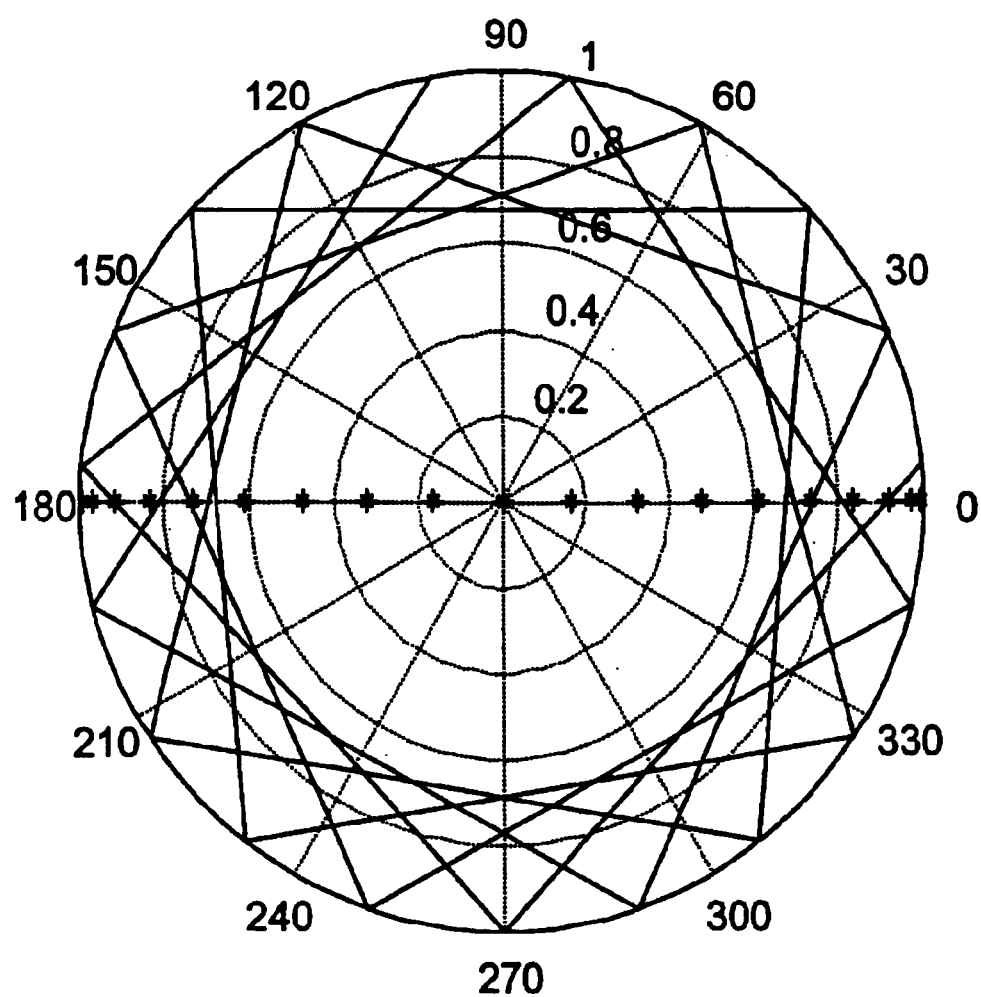
FIG. 3 is a polar plot illustrating a rotation of answer tone samples generated for the ratio A/B=19/5.

According to an exemplary embodiment of the invention, a phase relationship of the samples can be altered in order to produce a larger number of unique samples. The results of such a phase relationship are depicted in a polar plot in FIG. 3, for example. To produce FIG. 3, the polar plot of FIG. 2 has been rotated by a phase angle θ=π/(2×A). As a result, there are 19 projected points that result in only 10 unique points since each projected point on a positive axis has an equal valued projected point on a negative axis. (Note that, for purposes of counting unique PCM codewords, the sign bit may be ignored.)

In turn, in the exemplary embodiment, 19 distinct samples and 19 unique points result. Experimentation has shown that the minimum distance between the absolute values of any two samples (as reflected on the horizontal axis, for instance) can be achieved with a phase shift of θ=π (0.167005)/A.

Figure 4:
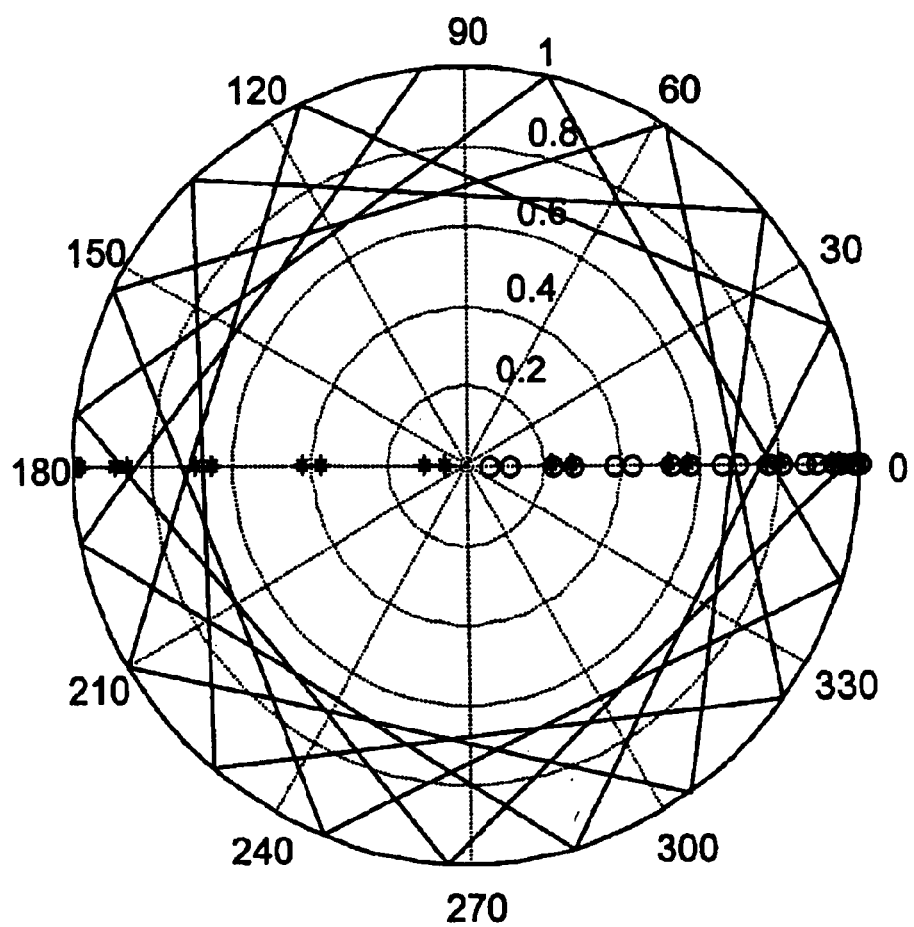
FIG. 4 is a polar plot illustrating a rotation of the samples generated for the ratio A/B=19/5using an optimal phase offset.

FIG. 4 shows a circular progression plot using a phase shift of θ=π(0.167005)/A and the ratio A/B=19/5 to generate a maximum number of unique samples. As shown in FIG. 4, 19 unique samples (shown as circles on the horizontal axis corresponding to absolute values of unique samples) are generated using the specified phase shift. However, the fact that there are 19 unique samples does not imply that 19 unique PCM codewords may be generated via μ-Law/A-Law encoding or that maximizing the minimum distance between any two samples is the best metric for obtaining the most unique set of PCM codewords. In fact, because the μ-law compression is used to generate PCM codewords, the phase shift of θ=π(0.167005)/A or maximizing the minimum distance between any two samples is not the optimal metric.

In order to account for the claw encoding, a circle representing the angular progression curve may be stretched horizontally to obtain a contour such that the quarter-arc in the top-right quadrant of the circle approximates the amplitude compression curve of, for example, a μ-law compression curve. The quarter arc curve may then be replicated in a symmetrical manner to generate the oval. In turn, the points on the new oval may be generated by the same angular progression around the origin. Therefore, since the oval reflects the μ-law compression the "maximizing the minimum distance between any two points" metric may now be applied to find the optimal phase offset. Alternatively, and with similar results, the samples could be generated with various phase offsets and then μ-law encoded to obtain a set of PCM codewords. The set of PCM codewords can then be histogrammed for each phase offset to determine the number of PCM codeword "hits," and the phase offset(s) that provides the greatest number of hits would be considered the best.

In accordance with an exemplary embodiment, the processor in a modem can analytically generate an ANSpcm sequence by first generating a number of samples x according to the following equation, in which rounding function could be a rounding down function:

$$x = \text{Round}\{1000 \times \sqrt{2} \times \cos(2\pi k \times B/A + \theta)\} \text{ for } k = 1, 2, \ldots, A$$

Alternatively a sine function or some approximation to the cosine function may also be used in place at the cosine function. For example, a truncated Taylor series expansion or other suitable approximation may be used. The scaling factor, 1000×√2, helps to ensure that the transmit level of the ANSpcm signal is −12 dBm0.

The modem processor may then μ-law encode each of the x sample values in order to obtain a corresponding PCM codeword. The resulting sequence of PCM codewords could then be transmitted over the network to the other modem. Alternatively, each sample value can be encoded and transmitted as it is produced (rather than waiting for all samples to be produced), to expedite the process.

Experimentation has shown that various A/B ratios and phase offsets can be used to produce a robust ANSpcm sequence. Table 2 summarizes some of the possible A/B ratios and phase offsets.

TABLE 2

| PCM Codewords | A/B | $f_{ans}$ (Hz) | θ |
|---|---|---|---|
| 60 | 213/56 | 2103.286 | .28 × π/A |
| 61 | 221/58 | 2099.548 | .30 × π/A |
| 62 | 225/59 | 2097.778 | .25 × π/A |
| 64 | 251/66 | 2103.586 | .25 × π/A |
| 65 | 255/67 | 2101.961 | .26 × π/A |
| 65 | 259/68 | 2100.386 | .26 × π/A |
| 66 | 267/70 | 2097.378 | .24 × π/A |
| 67 | 289/76 | 2103.806 | .24 × π/A |
| 68 | 301/79 | 2099.668 | .25 × π/A |
| 69 | 317/83 | 2094.637 | .22 × π/A |
| 69 | 319/84 | 2106.583 | .25 × π/A |
| 69 | 335/88 | 2101.493 | .24 × π/A |
| 70 | 339/89 | 2100.295 | .30 × π/A |

Of the values listed in Table 2, the A/B ratio 317/83 is particularly attractive because it produces 69 unique PCM codewords and, if implemented in a table lookup manner, would require only 317 entries.

However, except as claimed, the present invention is not necessarily restricted to using a particular one of the above or other A/B ratios. For example, instead of using an A/B ratio of 317/83, the invention can be implemented with an A/B ratio of 301/79. As shown in Table 2, this ratio can produce a repeatable sequence of codewords that includes 68 unique codewords. Advantageously, this ANSpcm sequence would represent an answer tone of frequency 2099.668 Hz, which is extremely close to the desired 2100 Hz answer tone frequency.

The formula provided above can also be further enhanced to vary the scaling factor from 1,000, so as to allow the ANSpcm signal to be transmitted at various different levels. Still further, a constant sample offset such as 0.5 can be added to the cosine function before scaling if desired. Thus, the equation above can be rewritten in the following form, for instance:

$$X_k = \lfloor scl \times \sqrt{2} \times \cos(2\pi k \times B/A + \theta) + 0.5 \rfloor k=0,1,2,\ldots,300.$$

In this equation, the scaling factor scl could be 1,000 or another desired value. And, as described above, the phase rotation angle θ helps to ensure that a large number of unique ANSpcm code words are generated.

Using an A/B ratio of 301/79 and a phase angle of 0.25×π/301, Table 3 lists four possible ANSpcm transmission levels.

TABLE 3

| Transmit level | Scl | | θ |
| | μ-Law | A-law | |
|---|---|---|---|
| −9 dBm0 | 1334 | 667 | 0.25 × π/301 |
| −12 dBm0 | 1000 | 500 | 0.25 × π/301 |
| −15 dBm0 | 708 | 354 | 0.25 × π/301 |
| −18 dBm0 | 500 | 250 | 0.25 × π/301 |

As noted above, the invention is not necessarily restricted to use of 301 samples. Further, other periodic functions, such as a sine function or Taylor series expansion generator, can be used to generate a continuous sequence of k samples.

The samples are preferably μ-Law or A-law encoded according to ITU Recommendation G.711, so as to generate a sequence of 301 corresponding PCM codewords, 68 of which are unique. These 301 codewords are listed in a table shown in FIG. 5 for both μ-law and A-law encoding, and for each of the four transmission levels listed in Table 3.

In the exemplary embodiment, a modem can then send this sequence repeatedly to another modem concurrently as both (i) an answer tone and (ii) a probing signal that allows the other modem to analyze the line conditions and determine whether conditions are such that a shortened training sequence can be employed.

FIG. 6 is a flow chart illustrating a method 200 for analytically and dynamically generating and sending an ANSpcm signal in accordance with an exemplary embodiment of the present invention. This method can preferably be employed by either of the modems shown in FIG. 1 and will be described as being employed by modem 10.

Referring to FIG. 6, at step 202, modem 10 receives a request to enter a communication session with another device such as modem 24. The request may take the form of a ring signal, which modem 10 detects and which causes modem 10 to responsively go off hook and establish a communication link with modem 24.

At step 204, processor 32 retrieves from the data storage medium 30 a first set of machine language instructions that define the function $X_k$ as follows:

$$X_k = \lfloor scl \times \sqrt{2} \times \cos(2\pi k \times B/A + \theta) + 0.5 \rfloor.$$

In addition, the processor preferably retrieves from the data storage medium a set of parameters defining values for the B/A ratio (including the number of samples A), the phase angle θ, and the scaling factor scl. In the exemplary embodiment, the ratio B/A is 79/301, the phase angle θ is 0.25×π/301, and the scaling factor scl is one of the scaling factors shown in Table 3, depending on the type of PCM coding and on the desired transmission level.

At step 206, the arithmetic/logic unit 36 of the modem's processor then generates a sequence of 301 digital samples representing an answer tone signal. To do so, the processor preferably applies the above algorithm $X_k$ over values of k extending from 0 to 300. More particularly, the cosine/sine generator 26 may generate each kth sample by computing a function $f(k)=\cos(2\pi k \times B/A+\theta)$, where the B/A ratio is 79/301 and θ=0.25×π/301. For each such sample, the arithmetic/logic unit may then compute a function y(k) by multiplying the sample by a scaling factor scl×√2 and then adding an offset of 0.5 to the value y(k). Finally, the arithmetic/logic unit may round down the result.

At step 208, as the processor 32 generates the sample values or when the processor finishes generating the sequence of 301 sample values, the processor PCM-encodes each sample value to generate a corresponding codeword. To do so, for instance, the arithmetic/logic unit 36 may provide each sample to the PCM encoder 28, which encodes the sample using μ-law or A-law compression, as appropriate. As a result, the processor 32 produces a sequence of 301 PCM codewords, which beneficially includes 68 unique PCM codewords.

At step 210, preferably as modem 10 generates the 301 codewords, modem 10 sends the sequence of codewords over network 16 to another network device, such as modem 24. Modem 10 preferably sends the sequence repeatedly, so as to convey an answer tone to modem 24 for a duration sufficient to allow modem 24 to receive and interpret the transmission. For instance, modem 10 can repeatedly send the sequence of codewords for at least one second.

Alternatively to the method described in reference to FIG. 6, an entity in communication with modem 10 can analytically generate the sequence of codewords, for instance. Further, the entity can provide the sequence of codewords to the modem 10 that upon a receipt of the sequence of codewords may store the sequence of codewords in the look-up tables. Further, alternatively, modem 10 can store in lookup tables the sequence of samples generated as described in reference to step 206. In such an embodiment, an entity other than modem 10 may generate the sequence of samples and provide the sequence of samples to modem 10, and modem 10 may store the sequence in a look-up table. Modem 10 may then retrieve the sequence of samples from the look-up table and PCM encode the sequence as described in FIG. 6 at step 208, for instance.

FIG. 7 is a flow chart illustrating a method 220 for receiving a PCM-encoded answer tone and conducting an analysis to determine whether to apply a shortened training sequence, in accordance with an exemplary embodiment of the invention. This method may be employed by modem 24, for instance, upon receipt of codewords transmitted over network 16 from modem 10.

Referring to FIG. 7, at step 222, modem 24 receives a first codeword corresponding, for example, to a first codeword in the sequence of codewords cooperatively representing an answer tone signal. Thus, the first codeword received by modem 24 is preferably the first codeword transmitted by modem 10, the second codeword is the second transmitted, and so forth. During transmission, however, some or all of the codewords in the sequence may have been distorted due to a variety of network effects. These effects include, for example, robbing of bits and digital attenuation. Therefore, there may be some differences between the codewords as transmitted and the codewords as received.

At step 224, the arithmetic/logic unit 42 of the modem's processor generates a first codeword corresponding to the received first codeword. In other words, processor 38 generates an expected first codeword, representing a codeword that processor 38 expects the first codeword to be. To do so, the processor 38 retrieves from the data storage medium 48 a first set of machine language instructions that define the function $X_k$ as follows:

$$X_k = \lfloor scl \times \sqrt{2} \times \cos(2\pi k \times B/A + \theta) + 0.5 \rfloor.$$

In addition, the processor preferably retrieves from the data storage medium a set of parameters defining values for the B/A ratio, the phase angle θ, and the scaling factor scl.

In the exemplary embodiment, the function $X_k$ and the set of parameters associated with the function $X_k$ are identical to the function $X_k$ and the set of parameters that the modem 10 had used to generate the sequence of codewords using for example, the method 200. Thus, according to the exemplary embodiment, the B/A ratio is 79/301, the phase angle θ is 0.25×π/301, and the scaling factor scl is one of the scaling factors in the Table 3 that the modem 10 had used to generated the sequence of codewords. Using the function $X_k$ and the set of parameters, the arithmetic/logic unit 42 initially generates a sample value corresponding to the first received codeword, and the arithmetic/logic unit 42 may then generate a corresponding codeword. To do so, for instance, the arithmetic/logic unit 42 may provide the sample value to the μ-law encoder 46, which encodes the sample.

At step 226, arithmetic/logic unit 42 compares the received first codeword to the respectively generated codeword. To do so, in an exemplary embodiment, the processor 38 retrieves from the data storage medium 48 a second set of machine language instructions. Using the second set of machine language instructions, arithmetic/logic unit 48 may determine whether the winning hypothesis associated with the first stage of a previous DIL process is still valid. The winning hypothesis is related to the scaling factor that the line applied to the signal. Arithmetic/logic unit 42 can check if the winning hypothesis is still valid in a variety of ways. For instance, it can tabulate and average all of the received values based on what was transmitted and the phase in which it was transmitted. Arithmetic/logic unit 42 may be programmed to form a two-dimensional table consisting of six columns that represent six robbed-bit signaling phases in which the codewords are transmitted, and further consisting of 68 rows associated with 68 unique PCM codewords. Thus, if a row "i" corresponds to a transmitted codeword "j", then the entry in the i-th row and the k-th column corresponds to the average of all codewords of transmitted value j that were transmitted in the k-th phase, for instance.

At step 228, the arithmetic/logic unit 42 determines whether the received codeword is the last codeword of an expected set of codewords. If the received codeword is not the last codeword in the expected set of codewords, then the method 220 continues at step 222 where the modem 24 receives the next codeword and tabulates the codeword in the table.

Alternatively, the ANSpcm signal may be repetitively transmitted, or various different ANSpcm signals (i.e., represented by different sets of codewords) may be transmitted one after the other. Consequently, the ANSpcm signals may be continuously received and their codewords continuously collected and averaged.

For instance, arithmetic/logic unit 36 may apply algorithm $X_k$ over values of k extending from 0 to 300, using a first B/A ratio (e.g., 79/301) or other such parameter, so as to generate a first subsequence of samples. The arithmetic/logic unit may then apply algorithm $X_k$ over those k values again, but using a different B/A ratio (e.g., 85/317) or some other different parameter, so as to generate a second subsequence of samples that is different than the first subsequence. The two subsequences (and possibly more) together may then be considered a sequence of samples that represents the analog answer tone signal.

The processor then may PCM-encode both subsequences (during or after generation of the subsequences) so as to generate a first set of codewords corresponding to the first subsequence and a second set of codewords corresponding to the second subsequence. Given that at least two of the subsequences of samples are different from each other (in this example), the first and second sets of codewords will also likely be different from each other. Consequently, the resulting set of codewords (comprising at least the first set and second set) that is transmitted to the answering modem will contain more unique codewords than the set would contain if algorithm $X_k$ were used repetitively without change to any parameters. Notably, as indicated above, the use of more unique codewords may facilitate better distinguishing of line characteristics for purposes of deciding whether the line characteristics seem to be the same as they were in a previous connection.

If the received codeword corresponds to the last codeword in the sequence, then, at step 230, the arithmetic/logic unit 42 may determine whether the current channel characteristics are sufficiently similar to the prior channel characteristics. Thus, once the table has been completely filled, and preferably once the table has been filled more than once to average out any noise, the arithmetic/logic unit 42 can retrieve the winning hypothesis associated with the previous connection. Then, the winning hypothesis can be used to decode each of the averaged levels collected in the table. In particular, to decode each averaged level of the received codeword, the arithmetic/logic unit 42 may use a scaled PCM codeword lookup table such as a µ-law or an A-law lookup table associated with the winning hypothesis of the previous connection. Then, the arithmetic/logic unit 42 can compute a decoding error for each decoded codeword by comparing each averaged decoded codeword with the expected levels in the scaled PCM codeword lookup table. Then, the arithmetic/logic unit 42 can compute an overall decoding error by averaging computed decoding errors associated with all received codewords, for instance.

A combination of the decoding error values provides a measure for arithmetic/logic unit 42 to test whether the winning hypothesis drawn during the previous DIL processing (from the previous modem connection) is still valid. For instance, if the computed overall decoding error is below a predetermined threshold level, the arithmetic/logic unit 42 may conclude that the channel characteristics are the same as the channel characteristics associated with the previous connection. The predetermined threshold level could be determined based on a previous connection. More particularly, for instance, the predetermined threshold level could be selected as some level within a range of an error obtained when one of the original hypotheses was declared the winning hypothesis during a full DIL training sequence associated with the previous connection.

If and when the arithmetic/logic unit 42 determines that the channel characteristics are sufficiently similar to the channel characteristics associated with the previous connection, the modem 24 can generate a partial bitmap using a partial collection of PCM codewords in the ANSpcm signal. According to an exemplary embodiment, since modem 24 receives 68 codewords in ANSpcm signal, modem 24 generates the partial bitmap as opposed to a full bitmap that is typically generated during the DIL process when a modem receives 117 or 128 codewords in the DIL sequence. When the partial bitmap is created, the arithmetic/logic unit 42 can verify whether the partial bitmap is equal to the corresponding section of a full bitmap generated during the full DIL training sequence.

In this regard, even though the channel may be the same (in terms of attenuation, for instance) the phases of the robbed bits may be different in one instance of communication over the channel than in a previous instance of communication over that channel. For instance, the robbed bits phases may shift in such a manner that some robbed bits phases newly overlap or no longer overlap. In such a case, the modem 24 may not have an appropriate bitmap to reuse even when the connections' characteristics are the same.

At step 232, if arithmetic/logic unit 42 verifies that the characteristics of the current communication channel sufficiently match the characteristics of the previous channel, modem 24 may then opt to apply a shortened training sequence, using parameters established in the prior connection to initialize the communication. Generally, if the current communication channel sufficiently match the characteristics of the previous channel, configuration settings can be reused. Therefore, the channel capabilities parameters from the V.8 or V.8-bis, channel probing parameters, the winning hypothesis used to build decoding tables and possibly some or all of the bitmaps can be reused. Additionally, echo canceller taps and equalizer settings may also be reused as initial settings during a training process of the echo cancellers and equalizers.

If a determination is made that the characteristics of the current connection sufficiently match the characteristics of the previous connection, the foregoing arrangement will allow both communicating modems to quickly adjust their internal parameters. For instance, if the current channel characteristics are sufficiently similar to the prior channel characteristics, such as, for instance, the overall decoding error value is below a predetermined error threshold level, then, the V.8 and/or V.8bis stage, the line probing and part or all of the DIL training sequence of the standard startup sequence may be skipped. The conclusions established in those parts of the startup sequence during the previous connection may be applied in the current connection. Additionally, the conclusion regarding shortening training sequence reached by the modem 24 can be conveyed to the modem 10. According to an exemplary embodiment, the modem 24 may, for instance, send to the modem 10 an INFOq information signal, which may serve to notify modem 10 that it should apply a shortened training sequence. Similarly, if the modem 24 concludes that the shortened training sequence should not be applied, an INFOq information signal may include information indicating that a standard training sequence should be applied.

According to an alternative embodiment of the present invention, instead of receiving one codeword at a time and comparing it to a respectively generated codeword, modem 24 may apply a predefined algorithm so as to generate a predefined set of codewords upon receipt of an entire set of codewords from a transmission path. Modem 24 may then compare the entire set of codewords it received with the dynamically generated set of codewords so as to measure line characteristics. In turn, modem 24 may determine whether the measured line characteristics are substantially the same as the line characteristics that were present in a previous connection. If so, modem 24 may then conclude that a shortened training sequence is appropriate.

Further, alternatively, an entity in communication with modem 24 may generate an expected sequence of codewords and the generated sequence of codewords can be then stored on modem 24 for analysis, as discussed in reference to FIG. 7. Further, alternatively, modem 24 may store in look-up tables a sequence of samples generated as described at step 224. In such an embodiment, the sequence of samples may be generated by an entity other than modem 24. In such the embodiment, when modem 24 receives each codeword from modem 10, modem 24 may retrieve a respective sample from the look-up table and PCM encode the retrieved sample to produce a respective codeword. Variations on this arrangement are possible as well.

Further, using an exemplary embodiment of the present invention, it is possible to shorten a standard start-up training procedure even if arithmetic/logic unit 48 verifies that the current line characteristics are not sufficiently similar to the line characteristics that were present in a previous connection (or if otherwise desired). For instance, if the conclusion associated with the DIL processing and drawn during the previous connection is not valid for the current connection, modem 24 may request modem 10 to transmit only those codewords that were not included in the set of codewords representing the ANSpcm sequence of codewords. As known in the art, the current V.90 DIL signal may include up to 128 codewords that are transmitted by a modem. However, according to the exemplary embodiment, modem 24 receives about one half of the codewords required by the DIL signal in the analog answer tone signal. Thus, if a standard training sequence is required, according to the exemplary embodiment, modem 10 transmits codewords that were not included in the answer tone, and a duration of the DIL process is shortened by about one half.

However, because of noise and poor equalization, more than a minimum number of codewords may be required by the shortened DIL process, and it may not be sufficient for modem 24 to receive only the remaining codewords that were not transmitted in the signal representing the answer tone signal. For instance, modem 24 can determine that more than the minimum number of codewords may be required based on the error measurements obtained when decoding the sequence of codewords. Thus, if the channel is noisy or poorly equalized, the exemplary embodiment of the present invention improves the standard training sequence since modem 24 repeatedly collects some or all codewords already transmitted in the ANSpcm signal.

Further, if the winning hypothesis is still valid, arithmetic/ logic unit 42 may verify phases of robbed bits using the bitmaps derived using the method discussed in reference to FIG. 7. However, as known in the art, multiple digital segments may rob the same phase and, further, some of the robbed bits' phases may overlap. Thus, it is possible that a number of phases that are robbed or an effect of bit robbing may differ between subsequent training processes even if the channel characteristics are the same. In such cases, it may be necessary to determine a new transmit and receive codeword mapping. However, even in such cases, the information collected in a sequence of codewords representing an answer tone signal can be reused to shorten the full training sequence. Therefore, when the modem 24 receives a full sequence of codewords associated with a standard DIL signal, the modem 24 may be arranged to only analyze the codewords that were not received by the modem 24 in the sequence of codewords associated with the answer tone signal. Basically, the modem 24 can process and analyze only the remaining codewords and put little or no emphasis on processing the codewords associated with the answer tone signal.

In fact, because many unique codewords have already been transmitted as part of the ANSpcm signal, those unique codewords do not even need to be transmitted again as part of the DIL signal. Advantageously, it thus becomes possible to reduce the duration of the full training sequence.

In view of many embodiments to which the principles of the invention may be applied, it should be understood that the illustrated embodiment is the exemplary embodiment and should not limit the present invention except as defined by the claims. For example, unless specified to the contrary, the steps of the flow charts may be taken in sequence other than those described, and more or fewer elements or components may be used. Further, the present invention is not necessarily limited to the algorithm described in reference to the exemplary embodiment, and it should not necessarily limit the present invention.

We claim:

1. A method for initiating communication between a first modem and a second modem, the method comprising, in combination:

applying at a first modem a predetermined algorithm to dynamically generate a sequence of samples representing an analog answer tone signal;

encoding at the first modem the samples of the sequence, to generate a sequence of codewords; and providing the sequence of codewords for transmission to the second modem, whereby, the second modem may receive the codewords of the sequence and interpret the sequence of codewords to represent an analog answer tone signal.

2. The method of claim 1, wherein the analog answer tone signal comprises a sinusoid of frequency 2100 Hz±up to 15 Hz.

3. The method of claim 1, wherein applying the predetermined algorithm to dynamically generate a sequence of samples comprises generating m samples, each as a function $X(k)$, where k extends from n to m+n−1.

4. The method of claim 3, wherein computing the function of $X(k)$ comprises computing a periodic function of k.

5. The method of claim 3, wherein the function $X(k)$ comprises $\cos(2\pi k \times B/A + \theta)$.

6. The method of claim 5, wherein B/A is 79/301.

7. The method of claim 5, wherein $\theta$ is $0.25 \times \pi/301$.

8. The method of claim 3, wherein the function $X(k)$ comprises computing $Y = S \times \cos(2\pi k \times B/A + \theta)$.

9. The method of claim 8, wherein S is $1000 \times \sqrt{2}$.

10. The method of claim 8, wherein computing the function $X(k)$ further comprises rounding Y.

11. The method of claim 10, wherein rounding Y comprises rounding down Y.

12. The method of claim 10, wherein encoding the samples comprises PCM encoding Y.

13. The method of claim 1, wherein applying the predetermined algorithm to dynamically generate a sequence of samples comprises (i) applying the predetermined algorithm to generate a first subsequence of samples, (ii) applying the predetermined algorithm to generate a second subsequence of samples different than the first subsequence, and (iii) combining the first subsequence and the second subsequence, whereby the sequence of codewords comprises a corresponding first set of codewords and a corresponding second subsequence of codewords different than the first set of codewords.

14. In a method for initiating communication between a first modem and a second modem comprising performing a digital impairment learning process in which N codewords are transmitted from the first modem to the second modem and the second modem analyzes the number of codewords to determine line characteristics, the improvement comprising:

(a) performing the method of claim 1; and (b) thereafter, in the digital impairment learning process, transmitting to the second modem P codewords, wherein P is less than N.

15. The improvement of claim 14, wherein the P codewords exclude the codewords of the sequence of codewords provided in step (a).

16. A method for starting communication between a first modem and a second modem, the method comprising, in combination:

receiving at the second modem a sequence of codewords from the first modem, wherein the second modem recognizes the sequence of codewords as an encoded analog answer tone signal; and using the received sequence of codewords to determine whether to perform a shortened training sequence, by a process comprising:
   (A) decoding each received codeword to produce a corresponding received sample;
   (B) for each received sample, (i) applying a predetermined algorithm to dynamically generate a corresponding expected sample, (ii) comparing the expected sample to the received sample, and (iii) computing an error between the expected sample and the received sample;
   (C) computing an overall error value using the computed error value between the expected samples and the received samples; and
   (D) if the overall error value is less than a predetermined threshold value, deciding to perform the shortened training sequence, whereby the shortened training sequence may then be performed.

17. The method of claim 16, wherein the analog answer tone signal comprises a sinusoid of frequency 2100 Hz±up to 15 Hz.

18. The method of claim 16, wherein the predetermined threshold value comprises an error value determined based on a previous connection.

19. The method of claim 16, wherein applying the predetermined algorithm to dynamically generate the corresponding expected sample comprises:

using the predetermined algorithm employed to generate m samples, each as a function $X(k)$, where k extends from n to m+n−1.

20. The method of claim 19, wherein computing the function $X(k)$ comprises computing a periodic function of k.

21. The method of claim 19, wherein the function $X(k)$ comprises $\cos(2\pi k \times B/A + \theta)$.

22. The method of claim 21, wherein $\theta$ is $0.25 \times \pi/301$.

23. The method of claim 21, wherein B/A is 79/301.

24. The method of claim 19, wherein computing the function $X(k)$ comprises computing $Y = S \times \cos(2\pi k \times 79/301 + \theta)$.

25. The method of claim 24, wherein S is $1000 \times \sqrt{2}$.

26. The method of claim 24, wherein computing the function $X(k)$ further comprises rounding Y.

27. The method of claim 26, wherein the rounding Y comprises rounding down Y.

28. In a method for initiating communication between a first modem and a second modem comprising performing a digital impairment learning process in which N codewords from the first modem are received by the second modem and the second modem analyzes the number of codewords to determine line characteristics, the improvement comprising:
   (a) performing the method of claim 15; and
   (b) thereafter, in the digital impairment learning process, the second modem receiving and analyzing P of codewords, wherein P is less than N.

29. The improvement of claim 28, wherein the P codewords exclude the codewords of the sequence of codewords received in step (a).

30. A network device employing a training sequence to start communication, the network device comprising, in combination:
   a processor;
   a data storage medium;
   a first set of machine language instructions stored in the data storage medium and executable by the processor to dynamically generate a first set of codewords representing an analog answer tone signal;
   a line interface unit for transmitting the first set of codewords onto a transmission line and for receiving from the transmission line a second set of codewords;
   a second set of machine language instructions stored in the data storage medium and executable by the processor for using the second set of codewords to determine whether to employ a shortened training sequence.

31. The system of claim 30, wherein the network device comprises a modem.

32. The system of claim 30, wherein the analog answer tone signal comprises a sinusoid of frequency 2100 Hz±up to 15 Hz.

33. The system of claim 30, wherein the first set of instructions defines a predetermined algorithm for generating the first set of codewords.

34. The system of claim 33, wherein the predetermined algorithm comprises $X_k = \text{Round}\{1000 \times \sqrt{2}\cos(2\pi k \times 79/301 + 0.25 \times \pi/301)\}$.

35. The system of claim 30, wherein dynamically generating the first set of codewords comprises:
   generating m samples using a predetermined algorithm comprising $X_k = \text{Round}\{1000 \times \sqrt{2}\cos(2\pi k \times 79/301 + 0.25 \times \pi/301)\}$, wherein k extends from n to m+n−1; and
   encoding the m samples.

36. The system of claim 30, wherein the second set of codewords represents the answer tone signal.

37. The system of claim 30, wherein the processor uses each codeword of the second set of codewords to determine whether to employ the shortened training sequence.

38. The system of claim 37, wherein for each codeword of the second set of codewords, the processor (i) decodes each codeword, (ii) generates a respective sample associated with each codeword, (iii) compares each decoded codeword to the respectively generated sample, (iv) computes an overall error value between the decoded codewords and the respectively generated samples, and if the overall error value is lower than a predetermined threshold value, (v) employs the shortened training sequence.

39. The system of claim 30, wherein the data storage medium stores a sequence of samples to dynamically generate the first set of codewords.

40. The system of claim 30, wherein the network device communicates with an entity arranged to dynamically generate the first set of codewords and provide the first set of codewords to the network device.

41. The system of claim 30, wherein the network device communicates with an entity arranged to dynamically generate and provide to the network device respective sample values and codewords associated with the second set of codewords.

42. The system of claim 41, wherein the entity employs a predetermined algorithm comprising $X_k = \text{Round}\{1000 \times \sqrt{2}\cos(2\pi k \times 79/301 + 0.25 \times \pi/301)\}$ to generate the respective sample values and codewords.

43. The system of claim 41, wherein the network device uses the sample values and codewords generated by the entity to determine whether to employ the shortened training sequence.

44. A method for initiating communication between a plurality of modems, the method comprising, in combination:
   applying at a first modem a predetermined algorithm to dynamically generate a sequence of samples representing an answer tone signal;

encoding at the first modem the samples of the sequence to generate a sequence of codewords;

sending from the first modem the sequence of codewords to a second modem;

receiving at the second modem the sequence of codewords from the first modem, wherein the second modem recognizes the sequence of codewords as an encoded analog answer tone signal; and at the second modem, using the received sequence of codewords to determine whether to apply a shortened training sequence.

45. The method of claim 44, wherein the analog answer tone signal comprises a sinusoid of frequency 2100 Hz±up to 15 Hz.

46. The method of claim 44, wherein the predetermined algorithm comprises $X_k = \text{Round} \{1000 \times \sqrt{2}\cos(2\pi k \times 79/301 + 0.25 \times \pi/301)\}$.

47. The method of claim 42, further comprising at the second modem, decoding each received codeword to produce a corresponding received sample; and for each received sample, (i) applying the predetermined algorithm to dynamically generate a corresponding expected sample, (ii) comparing the expected sample to the received sample, (iii) computing an error value between the expected sample and the received sample, when all codewords are received, (iv) computing an overall error value using the computed error values for each received sample, and , if the overall error value is less than a predetermined threshold value, (v) applying the shortened training sequence.

48. The method of claim 47, wherein the predetermined threshold value comprises an error value determined based on a previous connection.

49. A method for initiating communication between a first modem and a second modem, the method comprising:

applying a first predetermined algorithm to dynamically generate a sequence of samples representing an analog answer tone signal;

encoding the samples of the sequence to generate a sequence of codewords; and providing the sequence of codewords for transmission to the second modem, whereby, the second modem may receive the codewords of the sequence and interpret the sequence of codewords to represent an analog answer tone signal.

50. The method of claim 49, wherein the analog answer tone signal comprises a sinusoid of frequency 2100 Hz±up to 15 Hz.

51. The method of claim 49, wherein the first predetermined algorithm comprises $X_k = \text{Round} \{1000 \times \sqrt{2}\times\cos(2\pi k \times 79/301 + 0.25 \times \pi/301)\}$.

52. The method of claim 49, wherein an entity in communication with the first a modem (i) applies the first predetermined algorithm to dynamically generate the sequence of samples, (ii) encodes the samples of the sequence to generate a sequence of codewords, and (iii) provides the sequence of codewords to the first modem.

53. The method of claim 52, further comprising storing on the first modem the sequence of codewords.

54. The method of claim 49, wherein an entity in communication with the first modem applies the predetermined algorithm to generate the sequence of samples and provides the samples of the sequence to the first modem.

55. The method of claim 54, further comprising storing on the first modem the sequence of samples and encoding the samples of the sequence to generate the sequence of codewords.

56. A method comprising:

generating a sequence of sample values by applying an algorithm comprising $X_k = \text{Round} \{scl \times \sqrt{2}\times\cos(2\pi k \times 79/301 + 0.25 \times \pi/301) + 0.5\}$, wherein k=0, 1, 2, . . . , 300, and wherein scl is a scaling value;

encoding the sample values of the sequence so as to produce a sequence of codewords; and repeatedly sending the sequence of codewords as an answer tone signal from an answering modem to an originating modem, as part of a training sequence to initiate communication between the answering modem and the originating modem.

57. A method comprising:

generating a sequence of expected sample values by applying an algorithm comprising $X_k = \text{Round} \{scl \times \sqrt{2}\times\cos(2\pi k \times 79/301 + 0.25 \times \pi/301) + 0.5\}$, wherein k=0, 1, 2, . . . , 300, and wherein scl is a scaling value;

receiving at an originating modem a sequence of incoming codewords that represent an answer tone signal transmitted from an answering modem;

decoding the incoming codewords of the sequence so as to produce a sequence of incoming sample values; and determining whether the incoming sample values are close enough to the expected sample values that a training sequence between the originating modem and the answering modem could be shortened.

58. A method comprising:

generating a sequence of expected sample values by applying an algorithm comprising $X_k = \text{Round} \{scl \times \sqrt{2}\cos(2\pi k \times 79/301 + 0.25 \times \pi/301) + 0.5\}$, wherein k=0, 1, 2, . . . , 300, and wherein scl is a scaling value;

encoding the expected sample values to produce expected codewords;

receiving at an originating modem a sequence of incoming codewords that represent an answer tone signal transmitted from an answering modem; and determining codewords are close enough to the expected codewords that a training sequence between the originating modem and answering modem could be shortened.

* * * * *